(12) United States Patent
Robillard et al.

(10) Patent No.: US 10,805,447 B2
(45) Date of Patent: Oct. 13, 2020

(54) APPARATUS, SYSTEM, AND METHOD FOR SECURING AND USING A MOBILE DEVICE IN A VEHICLE

(71) Applicant: Vehroot, LLC, Waunakee, WI (US)

(72) Inventors: Thomas James Robillard, Waunakee, WI (US); John Oliver Lindahl, Fruitport, MI (US); Shaun Peter Trites, Midland, MI (US); Benjamin Joseph Fisher, Stoughton, WI (US)

(73) Assignee: Vehroot, LLC, Waunakee, WI (US)

( * ) Notice: Subject to any disclaimer, the term of this patent is extended or adjusted under 35 U.S.C. 154(b) by 150 days.

(21) Appl. No.: 16/126,738

(22) Filed: Sep. 10, 2018

(65) Prior Publication Data

US 2019/0007541 A1  Jan. 3, 2019

Related U.S. Application Data

(63) Continuation of application No. 14/963,486, filed on Dec. 9, 2015, now Pat. No. 10,212,264.

(Continued)

(51) Int. Cl.
| | |
|---|---|
| *H04M 1/00* | (2006.01) |
| *H04M 1/60* | (2006.01) |
| *B60K 37/02* | (2006.01) |
| *B60R 11/02* | (2006.01) |
| *H04M 1/04* | (2006.01) |
| *H02J 50/12* | (2016.01) |

(Continued)

(52) U.S. Cl.
CPC .......... *H04M 1/6091* (2013.01); *B60K 37/02* (2013.01); *B60R 11/02* (2013.01); *B60R 11/0241* (2013.01); *B60R 11/0264* (2013.01);

*H04M 1/04* (2013.01); *B60R 2011/0005* (2013.01); *B60R 2011/0075* (2013.01); *H02J 7/0044* (2013.01); *H02J 7/025* (2013.01); *H02J 50/10* (2016.02); *H02J 50/12* (2016.02)

(58) Field of Classification Search
CPC ..... B60K 37/02; B60R 11/02; B60R 11/0241; B60R 11/0264; B60R 2011/0005; B60R 2011/0075; H02J 2310/40; H02J 50/10; H02J 50/12; H02J 7/0044; H02J 7/025; H04M 1/04; H04M 1/6091
See application file for complete search history.

(56) References Cited

U.S. PATENT DOCUMENTS

| | | |
|---|---|---|
| D590,404 S | 4/2009 | Kim |
| 7,900,988 B2 | 3/2011 | Ryu |

(Continued)

OTHER PUBLICATIONS

"Mobile Home adds a Siri button to any car," internet printout, https://www.engadget.com/2014/08/02/mobile-home-adds-a-siri-button-to-any-car/, printed Aug. 21, 2017, 13 pgs.

(Continued)

*Primary Examiner* — Xin Jia
(74) *Attorney, Agent, or Firm* — Boardman & Clark LLP

(57) ABSTRACT

Disclosed is a mobile device vehicle apparatus comprising a housing portion having a wiring harness and a shelf portion having an inclined surface and lip, the lip extending away from the inclined surface, wherein the housing portion or the shelf portion further comprising a wireless data transmission module, a wiring harness, and a wireless charger; and wherein the wireless charger is provided behind the inclined surface of the shelf portion.

20 Claims, 39 Drawing Sheets

Related U.S. Application Data

(60) Provisional application No. 62/556,137, filed on Sep. 8, 2017.

(51) Int. Cl.
   *H02J 7/00*   (2006.01)
   *H02J 7/02*   (2016.01)
   *B60R 11/00*  (2006.01)
   *H02J 50/10*  (2016.01)

(56) References Cited

U.S. PATENT DOCUMENTS

| | | | |
|---|---|---|---|
| D688,235 S | 8/2013 | Song | |
| D715,284 S | 10/2014 | Iwamoto | |
| 8,892,172 B2 | 11/2014 | Grivas et al. | |
| 9,150,105 B2 | 10/2015 | Crepaldi et al. | |
| 9,251,627 B2 | 2/2016 | Carl | |
| D765,648 S | 9/2016 | Starkenburg | |
| 9,446,720 B1 | 9/2016 | Prazeres et al. | |
| D771,545 S | 11/2016 | Kasparian | |
| 9,521,224 B2 | 12/2016 | An et al. | |
| D810,655 S | 2/2018 | Dabel | |
| 2007/0015537 A1* | 1/2007 | DeBiasio | H04M 1/6091 455/556.1 |
| 2014/0128049 A1* | 5/2014 | Aoki | H04M 1/72569 455/418 |
| 2014/0191584 A1* | 7/2014 | Kato | H01F 38/14 307/104 |
| 2015/0172432 A1* | 6/2015 | An | B60R 11/02 455/556.1 |
| 2016/0173667 A1 | 6/2016 | Torres Gutierrez et al. | |
| 2016/0288646 A1* | 10/2016 | Bouaziz | B60K 37/04 |
| 2018/0004250 A1 | 1/2018 | Barnett et al. | |

OTHER PUBLICATIONS

"Mobile Electronics Pro-Series, MobileDock Dash Mount," Mobile Electronic Dash Mounting Hardware, product literature for Model No. IPM-228-BL, 2 pgs.

Sonic Electronix, printout of Sony XSP-N 1BT, Smartphone Cradle Bluetooth Car Stereo Cell Phone in Dash Radio CD, 4 pgs.

Wireless Power Consortium, www.wirelesspowerconsortium.com/blog, Qi Wireless Charging and Cardiovascular Electronic Devices, 8 pgs.

www.amazon.com/TYLT-Wireless-Phone-Charging-Pad/dp/B00DG8NVQ1/, TYLT VUQi Wireless Phone Charging Pad: 3 Coil Stand & Fast Battery Charger Station for compqatible iPhone Galaxy Note Lumia Droid DNA LG Google & Android Cell Phones, item on Amazon, printed Feb. 7, 2018, 9 pgs.

www.ebay.com/itm/Bracketron-IPM-228-BL-MobileDocke-Dash-Mount-Brand-New, Bracketron IPM-228-BL MobileDock Dash Mount (Brand-New), item on eBay, printed Feb. 7, 2018, 6 pgs.

www.sony.com/en-sa/electronics/in-car-receivers-players/xsp-n1bt, In-Car Bluetooth Audio Receiver & Smartphone Cradle, XSP-N1BT, Sony SA, printed May 31, 2017, 14 pgs.

www.tylt.com/vu-wireless-charger, TYLT Vu Wireless Charger, Qi Charging Station & Iphone 8, 8 Plus & X Pad, printed Feb. 8, 2018, 4 pgs.

Goodwin, Antuan, "What should you look for when choosing a car stereo?", dated Jan. 24, 2014, https://www.cnet.com/roadshow/news/what-should-you-look-for-when-choosing-a-car-stereo.

* cited by examiner

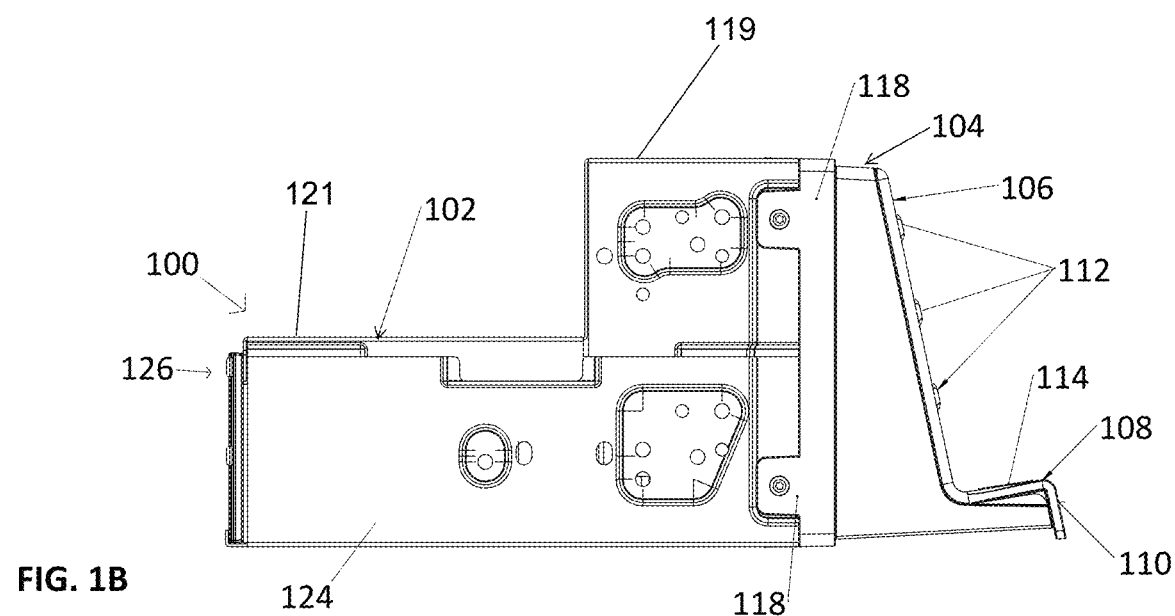

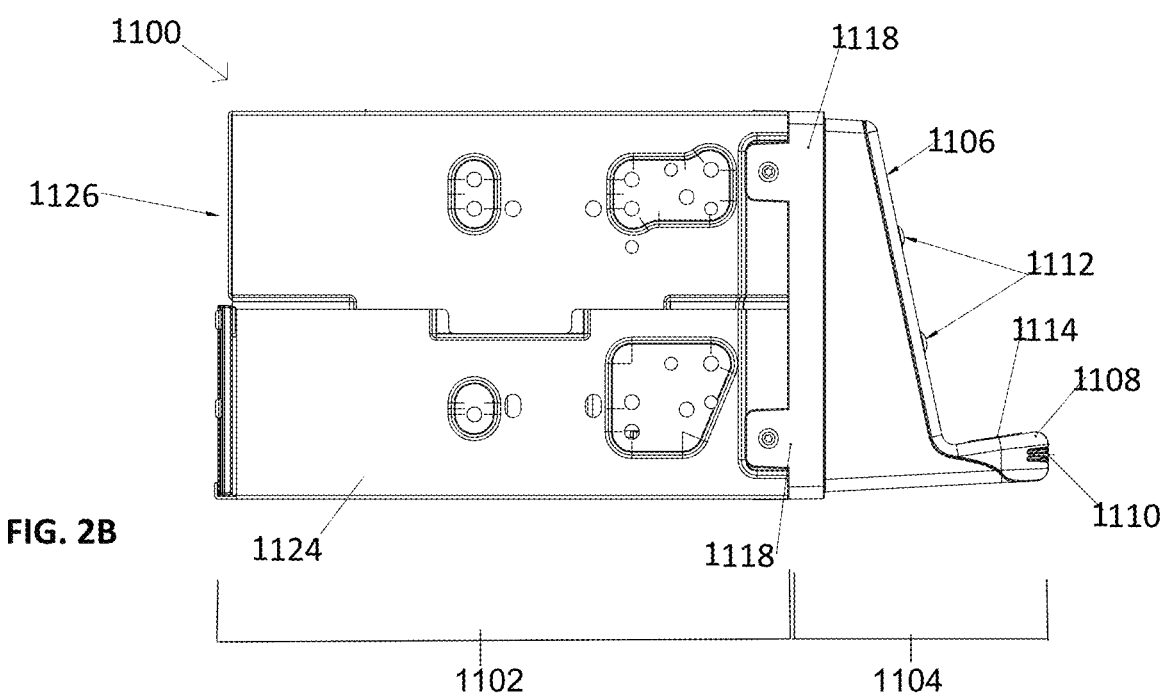

666

762  
Left Side View

760
Front Top View

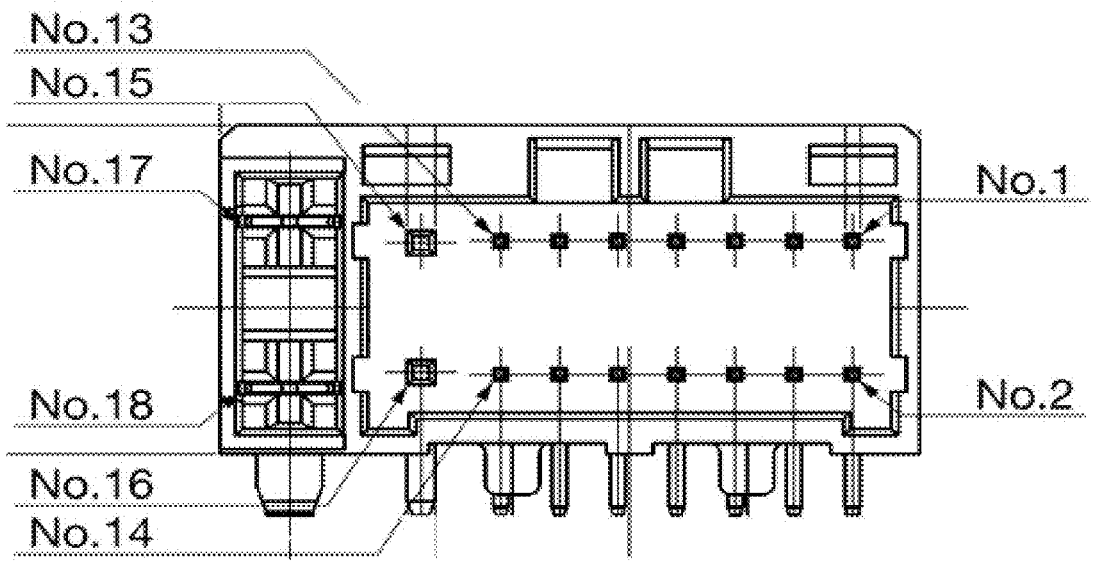

| Shelf Wire Harness Pin assignments | | |
|---|---|---|
| Pin# | Color | Description |
| 1 | white/black stripe | Front Speaker Left - |
| 2 | green/black stripe | Rear Speaker Left - |
| 3 | white | Front Speaker Left + |
| 4 | green | Rear Speaker Left + |
| 5 | gray/black stripe | Front Speaker Right - |
| 6 | purple/black stripe | Rear Speaker Right - |
| 7 | gray | Front Speaker Right + |
| 8 | purple | Rear Speaker Right + |
| 9 | orange | Dimming Input |
| 10 | blue | Resistive Channel A |
| 11 | blue/white stripe | CAN L |
| 12 | brown | CAN H |
| 13 | red | Ignition |
| 14 | pink | Resistive Channel B |
| 15 | black | Ground |
| 16 | yellow | Battery |
| 17 | NA | Fuse |
| 18 | NA | Fuse |

APPARATUS, SYSTEM, AND METHOD FOR SECURING AND USING A MOBILE DEVICE IN A VEHICLE

CROSS-REFERENCE TO RELATED APPLICATIONS

This application claims priority to U.S. patent application Ser. No. 14/963,486 filed Dec. 9, 2015 and U.S. Provisional Patent Application No. 62/556,137 filed Sep. 8, 2017 the entirety of each of which are incorporated herein by reference. This application is a continuation-in-part of U.S. patent application Ser. No. 14/963,486 filed Dec. 9, 2015.

BACKGROUND

Modern vehicles typically may come equipped with in-vehicle entertainment and/or navigation systems. For example, vehicles may include GPS systems, Bluetooth connection functionality, phone call features (directory, call and end call, etc.), music applications, etc.

Existing systems have a number of drawbacks. For example, known systems may have connectivity problems. In addition, known systems may require paid subscriptions to access certain functionality (for example, for GPS systems or music applications). Further, upgrades to firmware may create problems over time as a vehicle ages.

Use of a vehicle's in-vehicle entertainment and/or navigation systems may reduce consumer flexibility. Vehicle firmware may only allow use of one GPS, music, phone, etc. application or system. If a user has difficulties with that application or system, the user cannot shop for other applications or systems that better fit the user's needs.

Known systems may allow for limited interaction of the vehicle with a user's mobile device. Known systems may not provide a means for actually looking at the device, requiring users to dig around their cars to find the device, which may increase distraction.

What is needed is an apparatus, system, and method for overcoming these deficiencies.

SUMMARY OF THE INVENTION

Accordingly, various embodiments of a mobile device vehicle apparatus, system, and method is disclosed ("apparatus"). While the term "shelf" and/or "apparatus" may be used to describe the device, system, and method, disclosed it may comprise a number of forms according to various embodiments. For example, the apparatus may comprise a dashboard, shelf, mount, receiver, or other structure.

In various embodiments, the apparatus may allow for a mobile device to be provided on a vehicle in an easily-accessible location. The disclosed apparatus may allow for connection of a mobile device into the vehicle system, allowing access to vehicle speakers and steering wheel button functionality. The apparatus may allow for the use of certain buttons to navigate music tracks, initiate and end phone calls, and use the mobile device's artificial intelligence (AI) functionality.

The apparatus may be shaped with an inclined surface having a tacky adhesive, magnets, or other fastening mechanism. In addition, the apparatus may have a lip featuring a non-slip surface. The apparatus may be designed for ease of placement, removal, and staying in place despite vehicle movement. The apparatus may allow for a mobile device to be provided at an angle, allowing for ease of view.

In various embodiments, the apparatus may allow for charging a mobile device. The apparatus may allow for wireless or inductive charging, for example, using an inductive charger such as a Qi charger (while Qi charging may be described, other inductive or wireless charging protocols or mechanisms should be contemplated as within the scope of this disclosure). The shelf (e.g. the apparatus) may allow for improved Qi charging capabilities, for example, by adjusting to align charging coils with the mobile device. The charging coils may be provided with a backing plate to reduce heat conductivity and act as a heatsink.

The apparatus may allow for use across known mobile device manufacturers. The apparatus may allow for using applications and functionality built into the mobile device. The apparatus may allow for use of the mobile device applications with the vehicle's built-in hardware such as speakers and steering wheel buttons.

Disclosed is a mobile device vehicle apparatus comprising: a housing portion comprising a wiring harness; and a shelf portion having an inclined surface and lip, the lip extending away from the inclined surface; wherein the housing portion or the shelf portion further comprising a wireless data transmission module, a wiring harness, and a wireless charger; and wherein the wireless charger is provided behind the inclined surface of the shelf portion. Further disclosed is a mobile device vehicle apparatus, wherein the wireless data transmission module comprises a Bluetooth module. Further disclosed is a mobile device vehicle apparatus wherein the wireless charger comprises a Qi charger. Further disclosed is a mobile device vehicle apparatus wherein the Qi charger is adjustable along an axis relative to the inclined surface of the shelf portion. Further disclosed is a mobile device vehicle apparatus wherein the wireless charger is provided on a heatsink material. Further disclosed is a mobile device vehicle apparatus wherein the heatsink material has a plurality of slots. Further disclosed is a mobile device vehicle apparatus wherein the plurality of slots receive a plurality of fasteners provided in the vehicle housing portion or shelf portion. Further disclosed is a mobile device vehicle apparatus wherein the heatsink material slides along an axis by way of the plurality of slots.

Disclosed is a system for enabling mobile device functionality in a vehicle, the system comprising: a vehicle comprising a dash; an apparatus provided into the dash, the apparatus comprising: a housing portion comprising a wiring harness; and a shelf portion having an inclined surface and lip, the lip extending away from the inclined surface; wherein the housing portion or the shelf portion further comprising a wireless data transmission module, a wiring harness, and a wireless charger; and wherein the wireless charger is provided behind the inclined surface of the shelf portion; and a mobile device provided on the shelf portion. Further disclosed is a system for enabling mobile device functionality in a vehicle wherein the mobile device rests with a back against the inclined surface of the apparatus shelf portion and a side against the shelf portion lip. Further disclosed is a system for enabling mobile device functionality in a vehicle wherein the wireless charger provides power to the mobile device. Further disclosed is a system for enabling mobile device functionality in a vehicle wherein the mobile device is wirelessly connected to the apparatus by way of the wireless data transmission module. Further disclosed is a system for enabling mobile device functionality in a vehicle wherein the wireless data transmission module is a Bluetooth module. Further disclosed is a system for enabling mobile device functionality in a vehicle wherein the apparatus is coupled to the vehicle by way of the wiring harness and the mobile device is thereby in communication with the vehicle by way of the apparatus. Further disclosed is a system for enabling mobile device functionality in a vehicle wherein the apparatus is connected to the mobile device by way of Bluetooth, Qi charging, or both.

Disclosed is a vehicle comprising: a dash; an apparatus provided into the dash, the apparatus comprising: a housing portion comprising a wiring harness; and a shelf portion having an inclined surface and lip, the lip extending away from the inclined surface; wherein the housing portion or the shelf portion further comprising a wireless data transmission module, a wiring harness, and a wireless charger; and wherein the wireless charger is provided behind the inclined surface of the shelf portion. Further disclosed is a vehicle wherein the vehicle further comprises speakers and a steering wheel button, and wherein the apparatus is in communication with the speakers and steering button. Further disclosed is a vehicle wherein the vehicle comprises a standard stereo port and the apparatus is provided in the vehicle stereo port. Further disclosed is a vehicle wherein the wireless charger is a Qi charger. Further disclosed is a vehicle wherein the steering wheel button accesses a mobile device in communication with the apparatus.

The advantages of this functionality may include, but are not limited to, not paying for vehicle-specific subscriptions (for example, mobile applications for navigation may be used instead of subscription vehicle plans), enabling use of preferred music applications and playlists on the mobile device with the vehicle hardware, and using mobile device AI which may be superior to vehicle firmware AI. In addition, the apparatus may allow for easy charging of a mobile device without extra wires. The apparatus may allow for ease of viewing of a mobile device.

These and various further advantages may be understood from the disclosure herein.

BRIEF DESCRIPTION OF THE FIGURES

FIG. 1B is a first side view of an example apparatus for use with the system and method herein for securing and using a mobile device in a vehicle.

FIG. 2B is a first side view of a second embodiment of an example apparatus for use with the system and method herein for securing and using a mobile device in a vehicle.

FIG. 14B shows a second view of an example wiring harnesses for use with an example apparatus for use with the system and method herein for securing and using a mobile device in a vehicle.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

Referring to the Figures, where like numbers exemplify like features across the several drawings, a mobile device vehicle apparatus, system, and method is disclosed. Again, while the term "apparatus" is used for purposes of ease of reference to describe an apparatus, system, and method, various other forms should be considered within the scope of this disclosure. For example, the apparatus may be a shelf, dashboard, a mount, a receiver, a repository, or other suitable structure capable of fulfilling one or more of the disclosed functions described herein. The apparatus may be shown as or otherwise comprise a single component or may be many components. In addition, the term "mobile device" should be understood to encompass various embodiments of portable computing devices such as, but not limited to, cellular phones, smart phones, tablet computers, and the like.

Figure 6A:
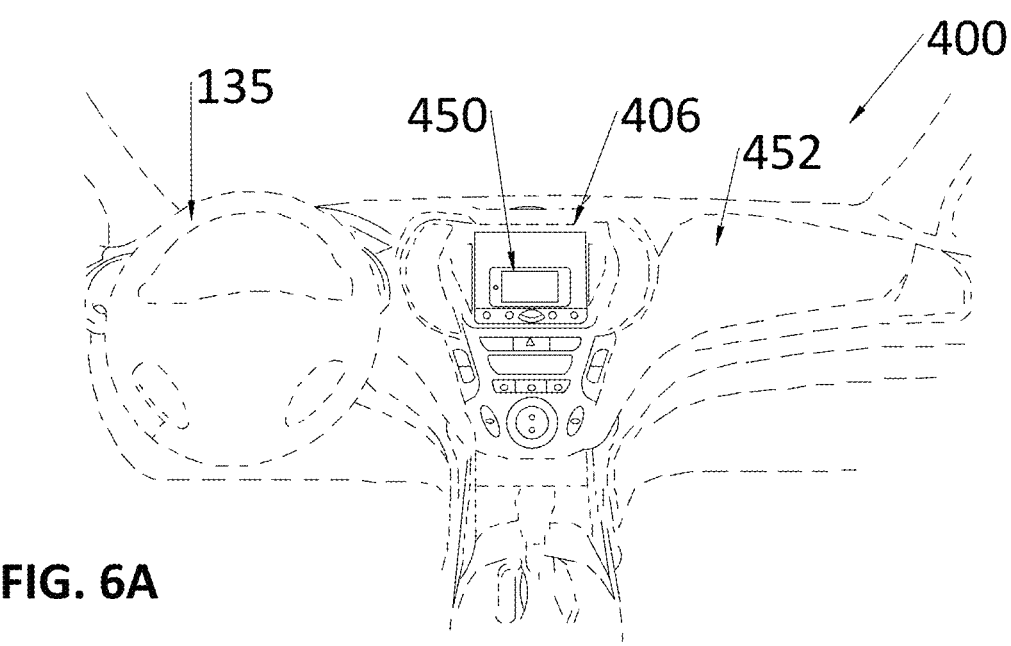
FIG. 6A is a view of an example apparatus for use with the system and method herein for securing and using a mobile device in a vehicle shown in a vehicle.
Figure 6B:
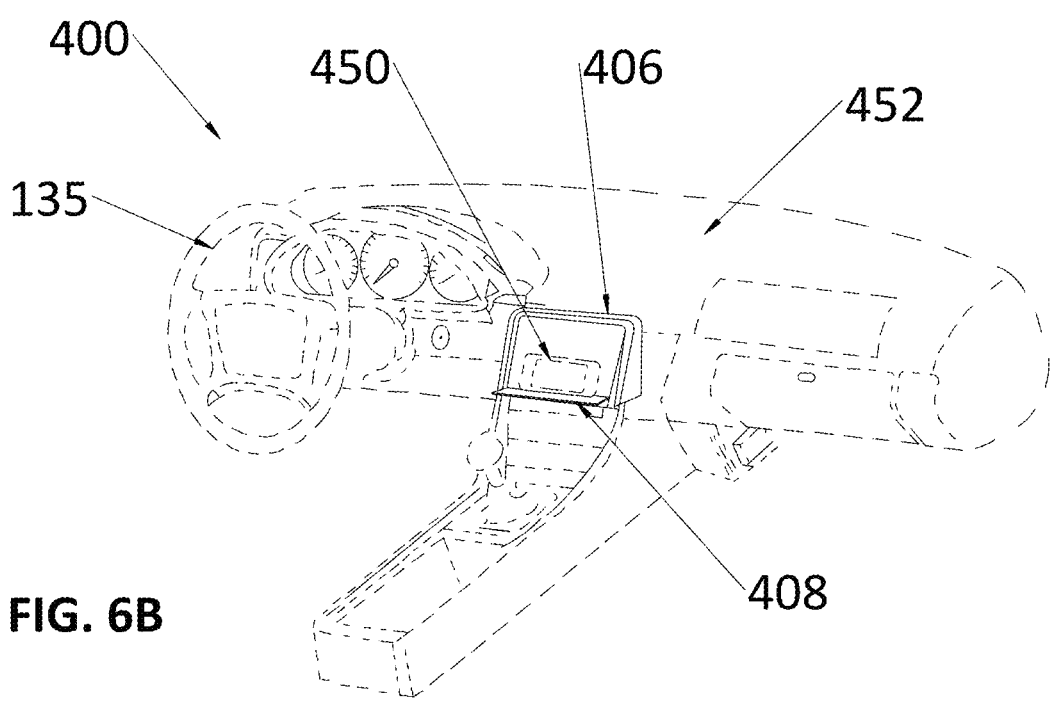
FIG. 6B is a second view of an example apparatus for use with the system and method herein for securing and using a mobile device in a vehicle shown in a vehicle.

FIGS. 1A-1F show a number of views of a first embodiment of an example mobile device vehicle apparatus 100 (apparatus for use with the system and method herein for securing and using a mobile device in a vehicle). Similarly, FIGS. 2A-2F show a number of views of a second embodiment of an example mobile device vehicle apparatus 1100 (apparatus for use with the system and method herein for securing and using a mobile device in a vehicle). Similarly, FIGS. 3A-3B and remaining figures may show a number of views of other embodiments of the apparatus (for example, 200, 300, 400, and 500), system, and method, according to various embodiments. The apparatus, in various embodiments, 100 and 1100, for example, as shown in FIGS. 1A-1F and FIGS. 2A-2F feature a shelf portion 104, 1104 and a housing portion 102, 1102. The shelf portion 104, 1104 may be understood to hold a mobile device 1150 while the housing portion 102, 1102 may be understood to facilitate installation into a vehicle dashboard (as an example, 452 as shown in FIGS. 6A and 6B).

The apparatus 100, 1100, etc. may include a top 120, 1120, first side 122, 1122, second side 124, 1124, back 126, 1126, cable inputs 128, 1128, wiring harness input 130, 1130, vents 132, 1132, along with a number of other components.

Figure 1A:
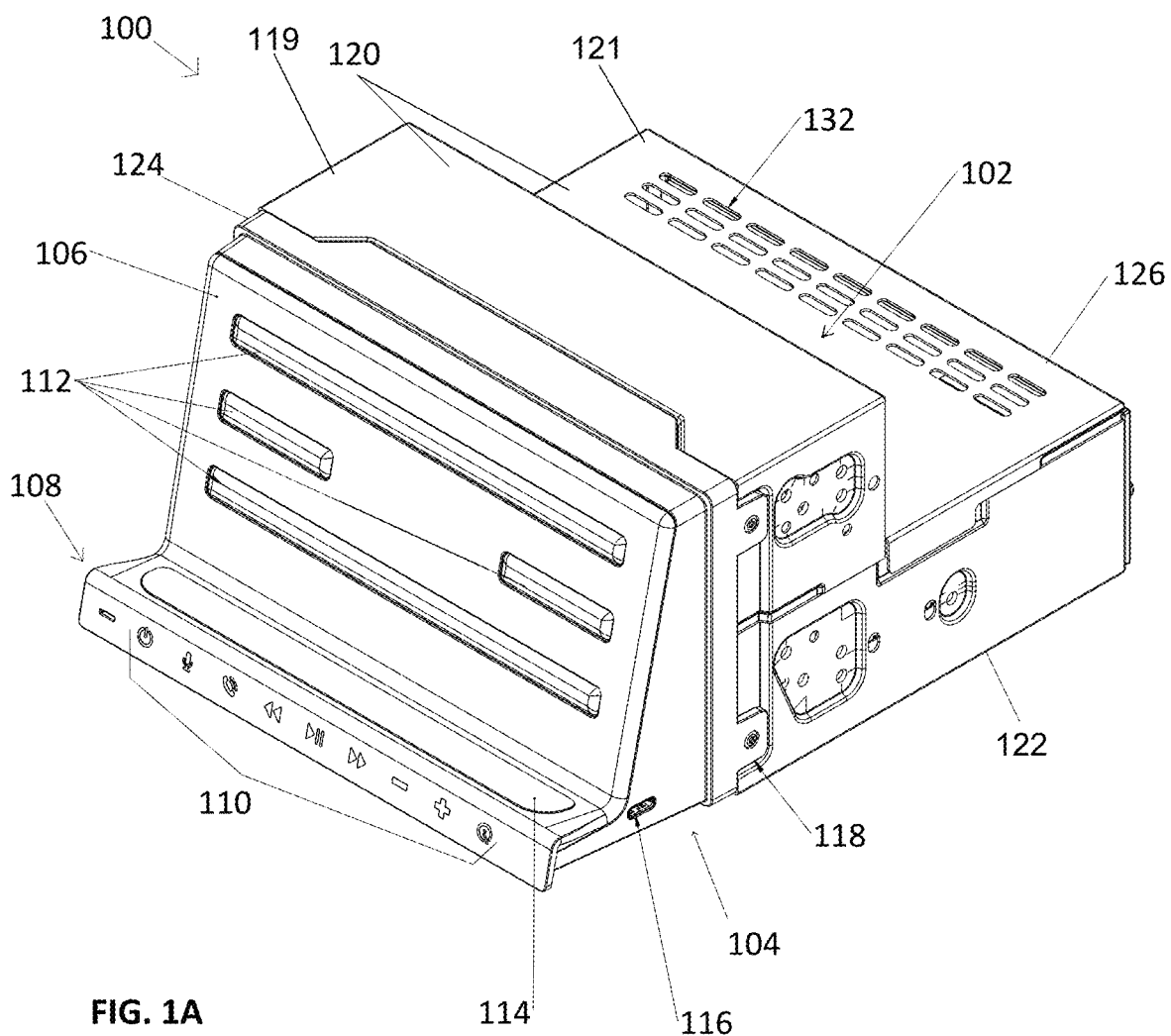
FIG. 1A is a first view of an example apparatus for use with the system and method herein for securing and using a mobile device in a vehicle.
Figure 1C:
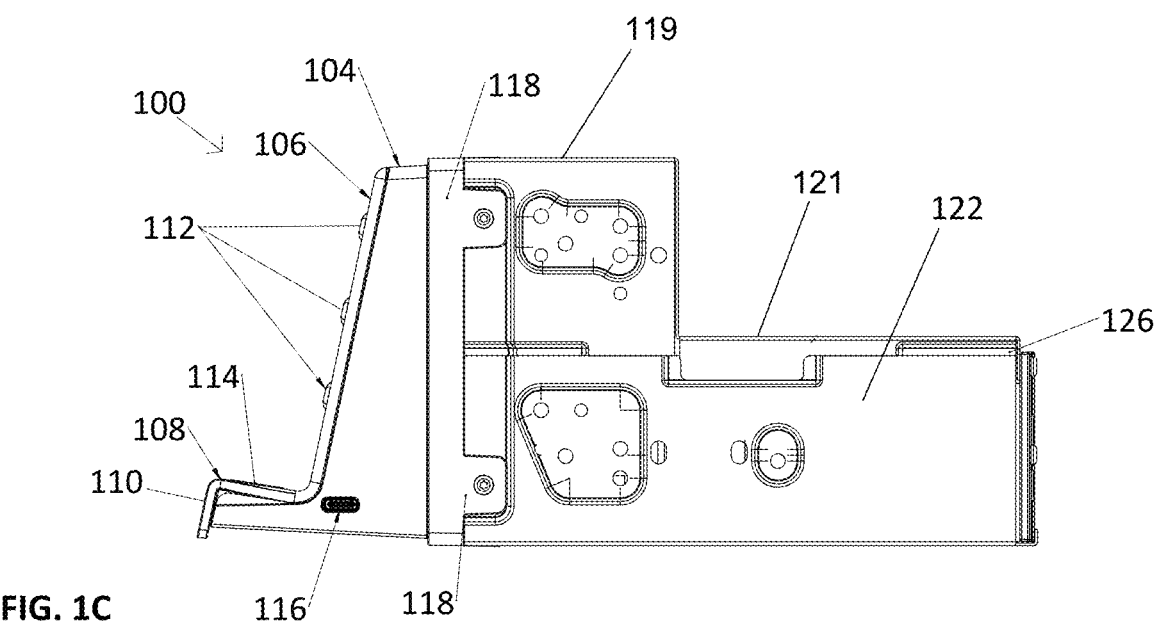
FIG. 1C is a second side view of an example apparatus for use with the system and method herein for securing and using a mobile device in a vehicle.
Figure 1D:
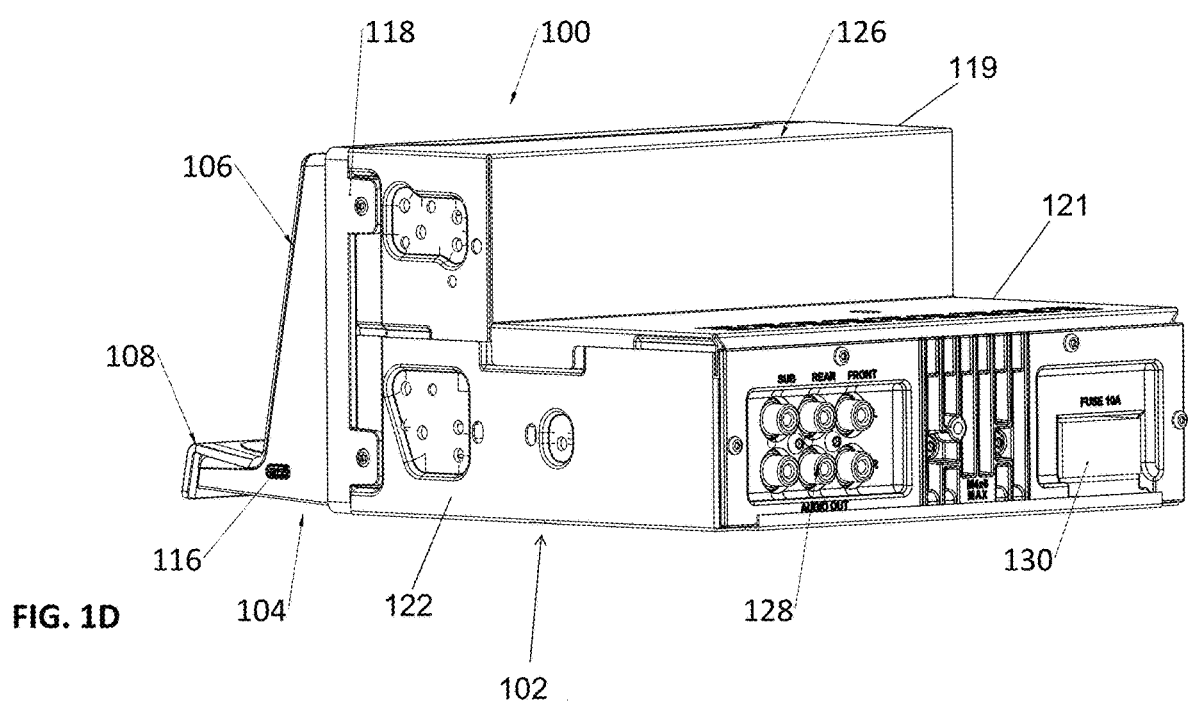
FIG. 1D is an oblique rear view of an example apparatus for use with the system and method herein for securing and using a mobile device in a vehicle.
Figure 1E:
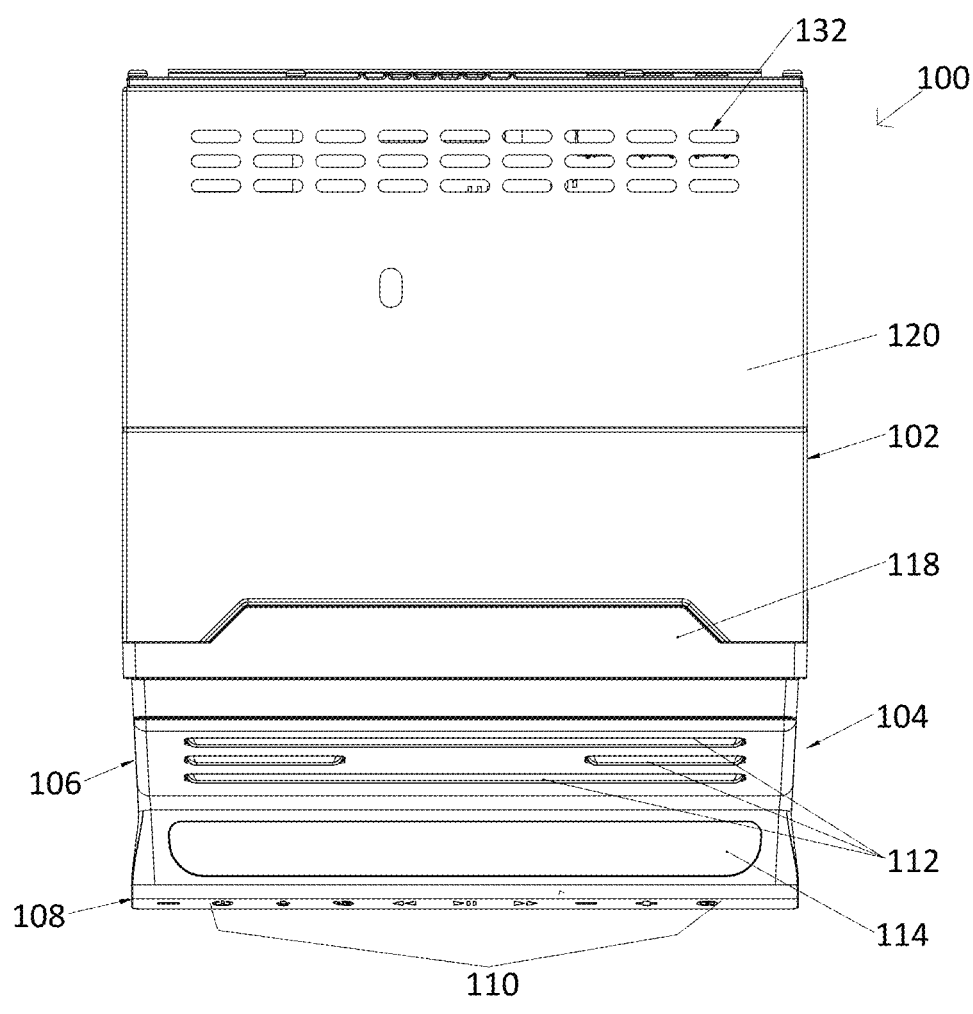
FIG. 1E is a top view of an example apparatus for use with the system and method herein for securing and using a mobile device in a vehicle.
Figure 2A:
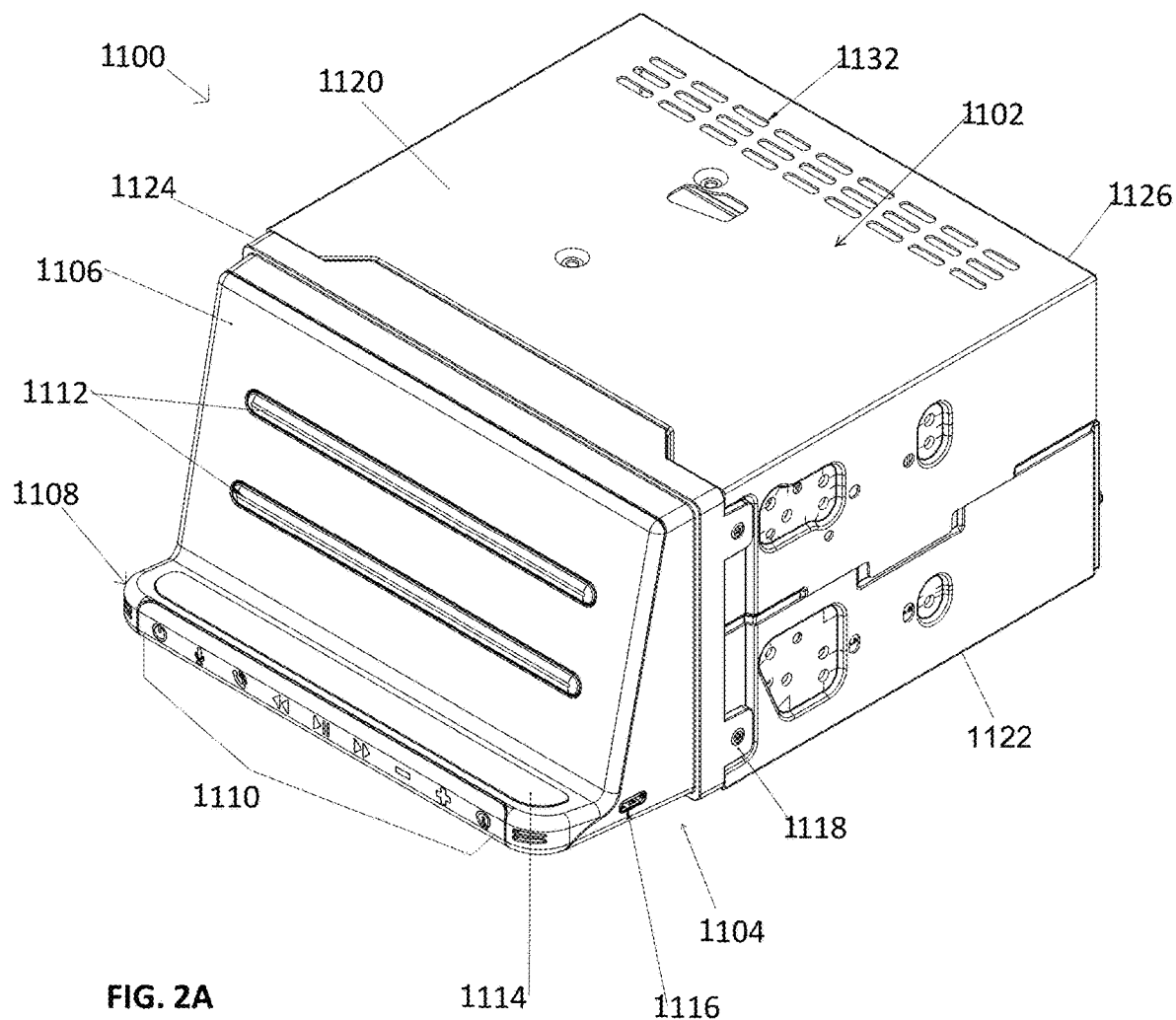
FIG. 2A is a first view of a second embodiment of an example apparatus for use with the system and method herein for securing and using a mobile device in a vehicle.
Figure 2C:
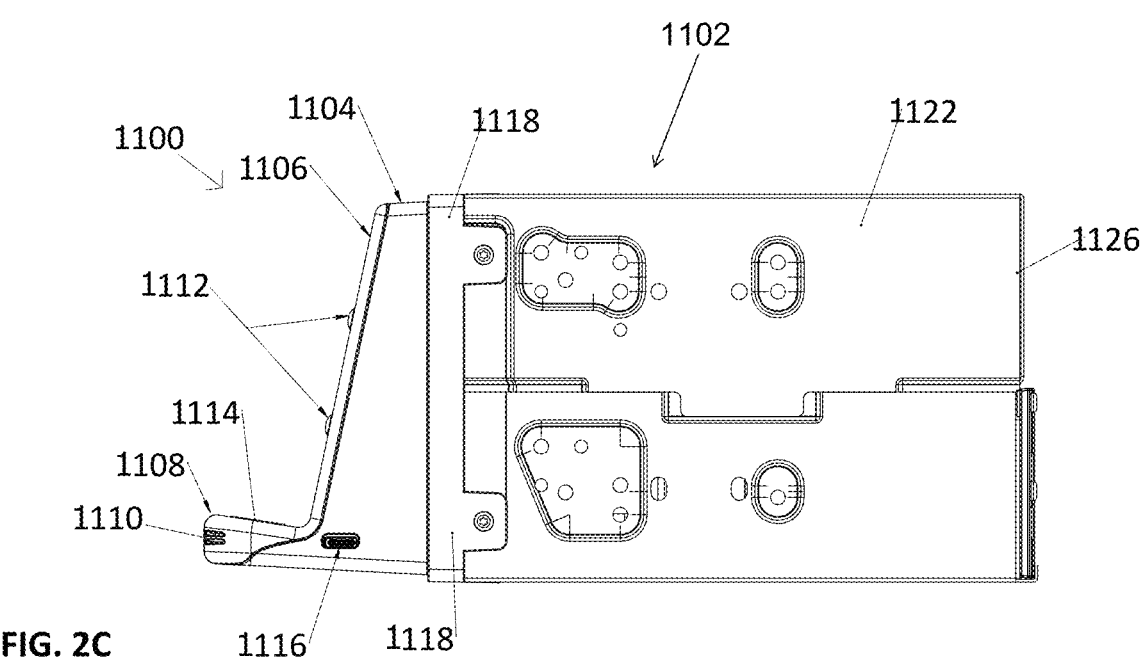
FIG. 2C is a second side view of a second embodiment of an example apparatus for use with the system and method herein for securing and using a mobile device in a vehicle.
Figure 2D:
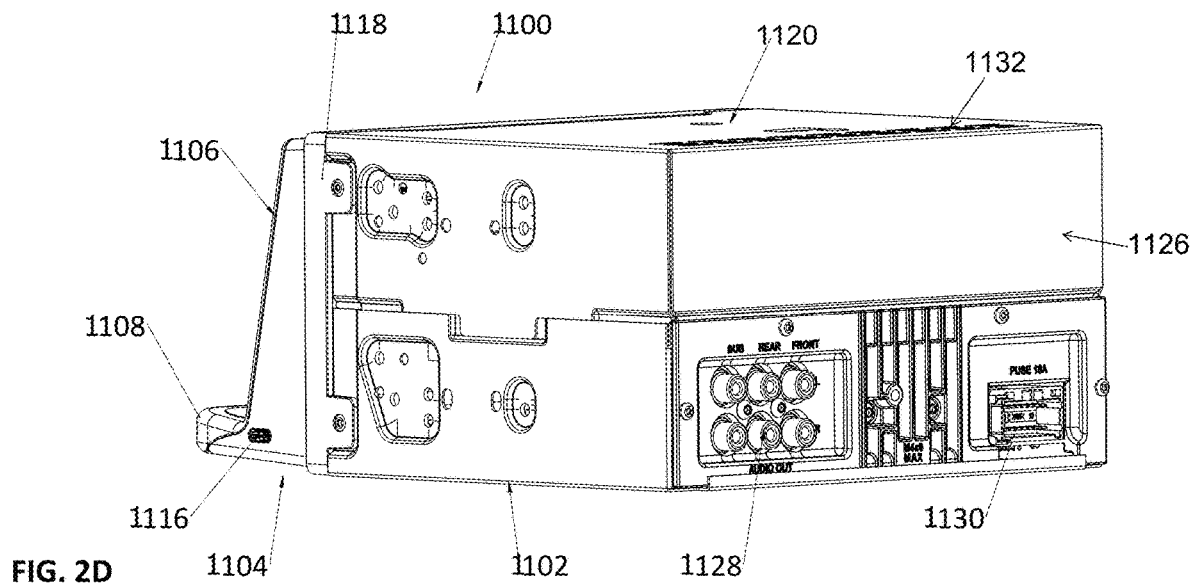
FIG. 2D is an oblique rear view of a second embodiment of an example apparatus for use with the system and method herein for securing and using a mobile device in a vehicle.
Figure 2E:
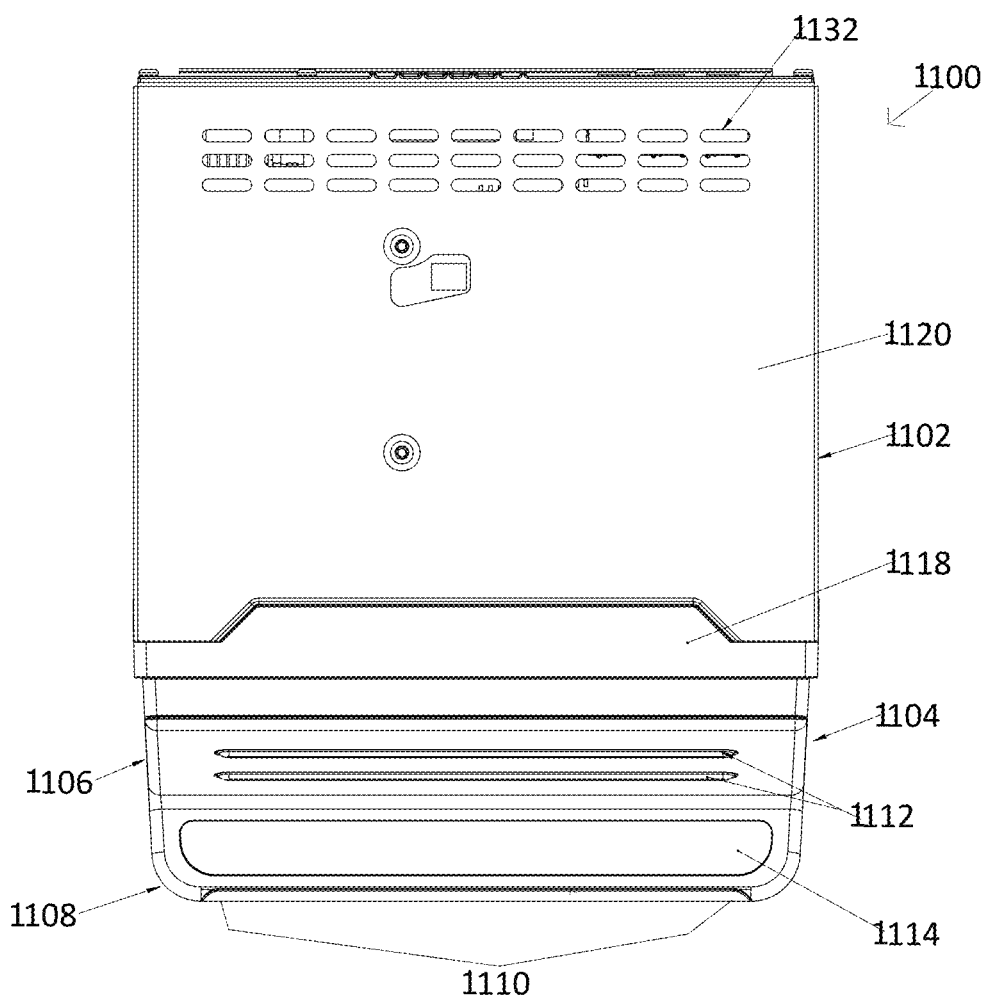
FIG. 2E is a top view of a second embodiment of an example apparatus for use with the system and method herein for securing and using a mobile device in a vehicle.
Figure 2F:
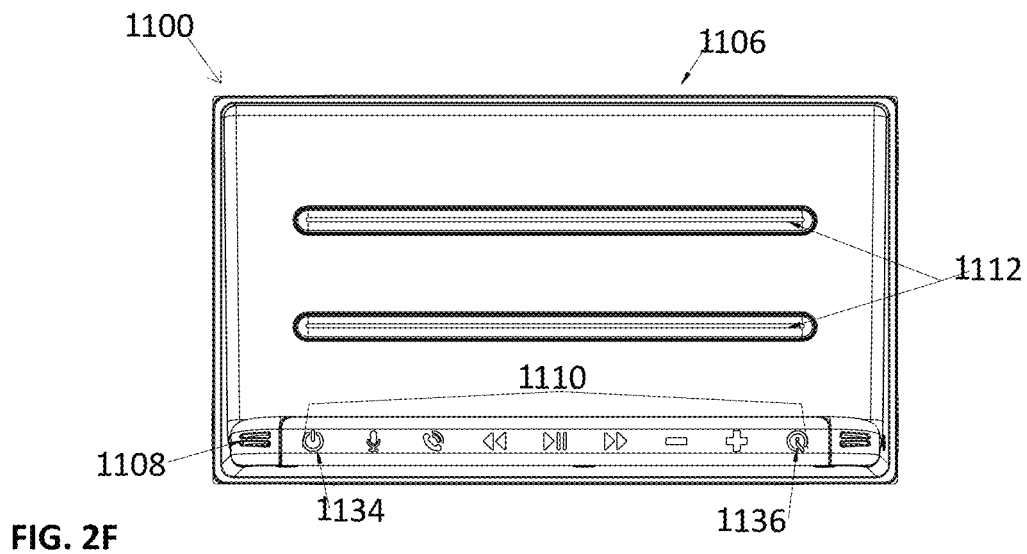
FIG. 2F is a front view of a second embodiment of an example apparatus for use with the system and method herein for securing and using a mobile device in a vehicle.

In various embodiments, the top 120 may further comprise a top upper portion 119 and top lower portion 121. This may give the apparatus 100 the appearance of a stepped profile when viewed from a first 122 or second 124 side (FIG. 1B and FIG. 1C). In contrast, FIGS. 2B and 2C show a second embodiment where top 1120 of housing portion 1102 is continuous, leading to a profile having a substantially uniform height.

Shelf Portion

The apparatus according to various embodiments (e.g. 100, 200, 300, 400, 1100 etc.) may comprise a shelf portion (104, 204, 304, 1104 etc.). Referring to the figures, the shelf portion 104, 1104, etc. may be substantially L-shaped. When the apparatus is provided into a vehicle (as a non-limiting example, as shown as 400 in FIGS. 6A-6B), the shelf portion 104 may extend from a vehicle dash 452. The shelf portion 104 may comprise a top, bottom, first, and second sides, as well as a front which comprises inclined surface 106 that terminates in a lip 108. The top, bottom, first, and second sides may extend from or be seen coupled to the housing portion 102. Similarly, in FIG. 2A, the shelf portion 1104 may be seen as comprising a top, bottom, first, and second sides, as well as a front which comprises inclined surface 1106 that terminates in a lip 1108. The top, bottom, first, and second sides may extend from or be seen coupled to the housing portion 1102. Also similarly, in FIG. 3A, the shelf portion 204 may be seen as comprising a top, bottom, first, and second sides, as well as a front which comprises inclined surface 206 that terminates in a lip 208. The top, bottom, first, and second sides may extend from or be seen coupled to the housing portion 202.

The shelf portion 104, 1104 may detach from the housing 102, 1102. For example, as can be seen in FIGS. 1A-1F and 2A-2F, the shelf portion 104, 1040 may include one or more flanges, side screws, or other suitable attachment structure 118, 1118 for connecting the shelf portion 104 and the housing 102. As can be seen in the figures, flanges having screws are shown acting as connectors 118, 1118 connecting the shelf portion 104, 1104 to the housing portion 102, 1102. Other fastening mechanisms should be contemplated as within the scope of this disclosure.

The inclined surface 106 of the shelf portion 104 may intersect with the lip 108 at an angle (for example, but not limited to, angles 344, 346 shown in FIG. 5) approximating ninety degrees (for example, 80-120 degrees, or more specifically 90-110 degrees). Alternatively, in various embodiments, the angle may exceed 90 degrees. Further example angles of intersection should be contemplated as within the scope of this disclosure. The inclined surface 106, 1106 and lip 108, 1108 may comprise one or more pieces. In various embodiments, the inclined surface 106, 1106 and lip 108, 1108 may open to allow access to the remainder of the mobile device shelf 100, 1100. In various embodiments, the inclined surface 106, 1106 and/or lip 108, 1108 may detach entirely or hinge away from a remainder of the apparatus 100, 1100, including a remainder of the shelf portion 104, 1104. The shelf portion 104 may comprise a removable face plate (e.g. inclined portion 106). Similarly, in FIG. 2A, the inclined surface 1106 and lip 1108 may comprise the shelf portion 1104 having features such as, but not limited to, those described above.

Figure 1F:
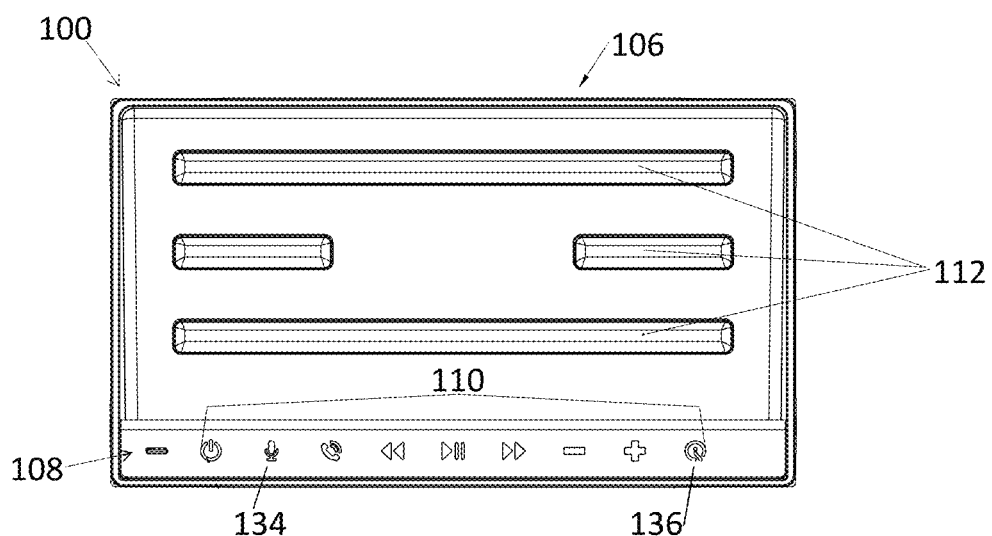
FIG. 1F is a front view of an example apparatus for use with the system and method herein for securing and using a mobile device in a vehicle.

The inclined surface 106, 1106 may include a gripping material 112, 1112. As shown in FIG. 1A and 1F, the gripping material 112 may comprise one or more strips of material (for example, two to four strips) (see also gripping material 1112 in FIG. 2A and 2F). The gripping material 112, 1112 may comprise a tacky or sticky material. In various embodiments, the gripping material 112, 1112 may be comprised of HDPE, two-part urethane, gel urethane, or similarly tacky material. The strips 112, 1112 may span a majority of the width of the shelf portion 104, 1104 or be interrupted. The strips, 112, 1112 may be used to secure a mobile device (e.g. 450) to the shelf portion 104, 1104.

Figure 3A:
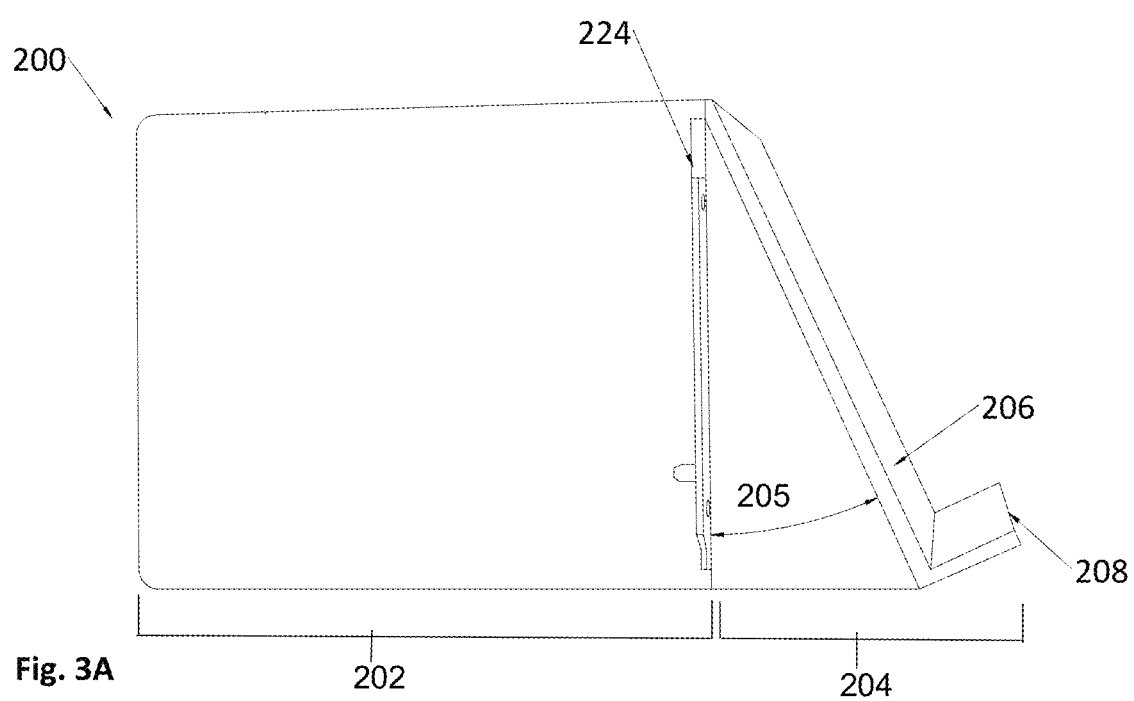
FIG. 3A is a side view of a third embodiment of an example apparatus for use with the system and method herein for securing and using a mobile device in a vehicle.
Figure 3B:
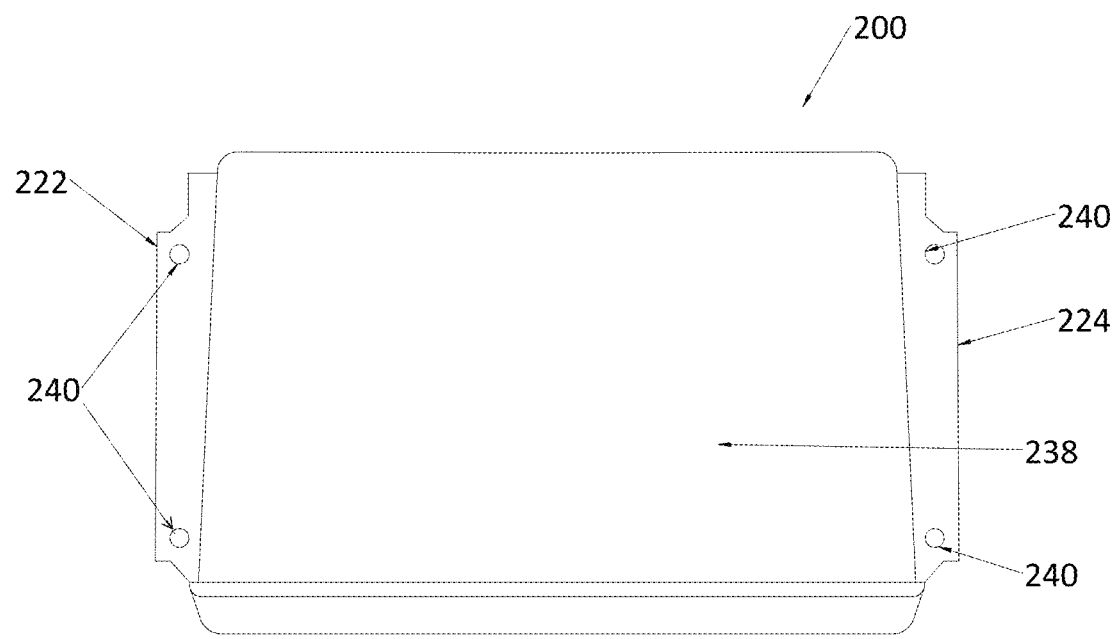
FIG. 3B is a top view of a third embodiment of an example apparatus for use with the system and method herein for securing and using a mobile device in a vehicle.
Figure 4:
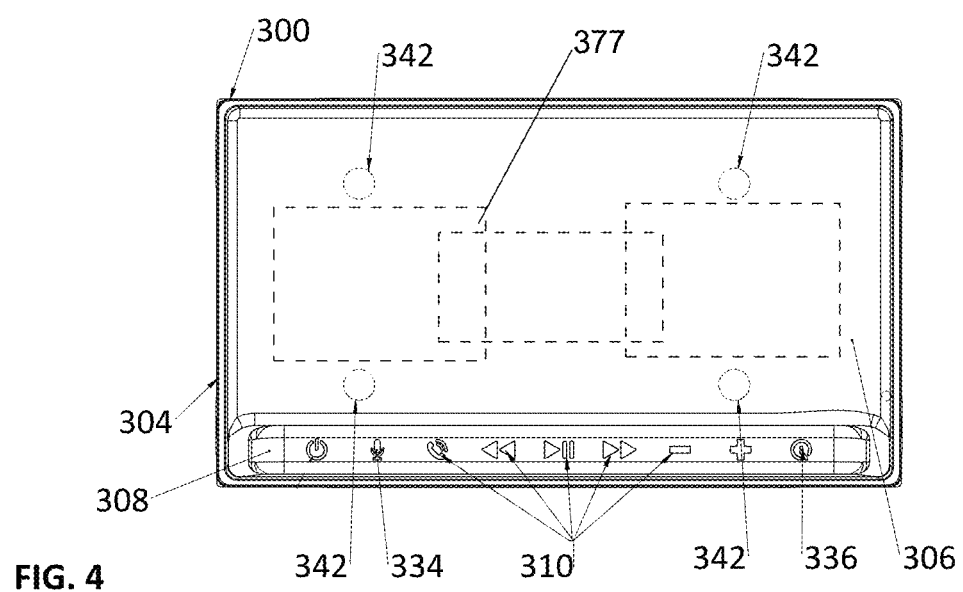
FIG. 4 is a front view of an example apparatus for use with the system and method herein for securing and using a mobile device in a vehicle featuring an embodiment of a fastening mechanism.

Alternatively, the inclined surface 106, 1106, 306 may include magnets 342, for example as shown in FIG. 4. The magnets 342 may be used to secure a mobile device 350 to the shelf portion 304. The magnets 342 may be positioned to not interfere with the functionality of the apparatus 300 as described herein. For example, in FIG. 4, the magnets 342 may be positioned away from one or more wireless charging (for example, but not limited to, Qi) coils 377 provided inside the apparatus. FIG. 3 likewise shows an apparatus 300 including a housing portion 302, shelf portion 304, inclined portion 306, lip 308, buttons 310, a USB access point 316, flange 318, AI button 334, and charging button 336.

Figure 5:
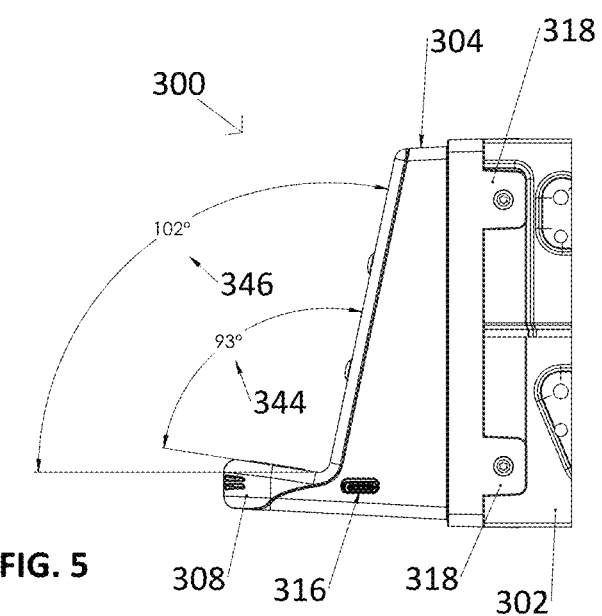
FIG. 5 is a side view of an example apparatus for use with the system and method herein for securing and using a mobile device in a vehicle, showing a range of shelf angles.

Referring again to FIGS. 1A-F and 2A-F, the lip 108, 1108 may extend away from the shelf portion 104, 1104 and may intersect with the inclined surface 106, 1106 at an angle. The lip 108, 1108 and inclined surface 106, 1106 may intersect at an angle approximating ninety degrees (for example, between 45 and 135 degrees). More specifically, in some embodiments of the invention, the angle of intersection may be between 93 and 102 degrees. These angles should be understood as examples and non-limiting. FIG. 5 shows an example of an apparatus 300 having a shelf portion 304 with an inclined portion and lip 308 having angle ranges 344, 346 suitable for use with the apparatus, system, and method described herein. The angle of intersection may facilitate visibility in a vehicle. The angle may allow for decrease in glare and heat transfer, while maximizing stability of the device on the apparatus. The angle may be suitable across mobile devices, which may vary substantially in size (for example, between a smart phone and a tablet).

Again, referring FIGS. 1A-1F and 2A-2F, the lip 108, 1108 may feature a gripping surface 114 to prevent a mobile device set on the apparatus 100 from moving. In various embodiments, the surface 114 may be comprised of GriPhone non-slip tape. Similar substances may be understood as within the scope of this disclosure.

The lip 108, 1108, 308 may feature buttons 110, 1110, 310 for accessing functionality within the mobile device. Looking to FIG. 1F, FIG. 2F, and FIG. 4 The buttons 110, 1110, 310 may allow for access to phone functionality such as play, stop, access AI/assistant on mobile device (using, for example, AI button 134, 1134, 334), notify whether wireless charging is connected (for example, if QI coil is charging) (for example, using charging button 136, 1136, 336), call, etc. In various embodiments, the lip 108, 1108, 308 may feature capacitive touch buttons. While positioning of buttons on the apparatus lip is disclosed, other locations should be contemplated as within the scope of this disclosure. For example, buttons may be provided on the housing portion 102, 1102 shelf portion 104, 1104 inclined surface 106, 1106 or other location on the apparatus 100, 1100 or in the vehicle.

The lip 108, 1108 may have various embodiments of profiles. For example, in FIG. 1A, the lip 108 portion featuring buttons 110 may be seen to be extending beyond a bottom of the shelf portion 104. Alternatively, as shown in FIG. 2A, the lip 1108 including the button 1110 portion may be relatively round and a bottom may be substantially flush with a bottom of the shelf portion 1104.

Housing Portion

Figure 14A:
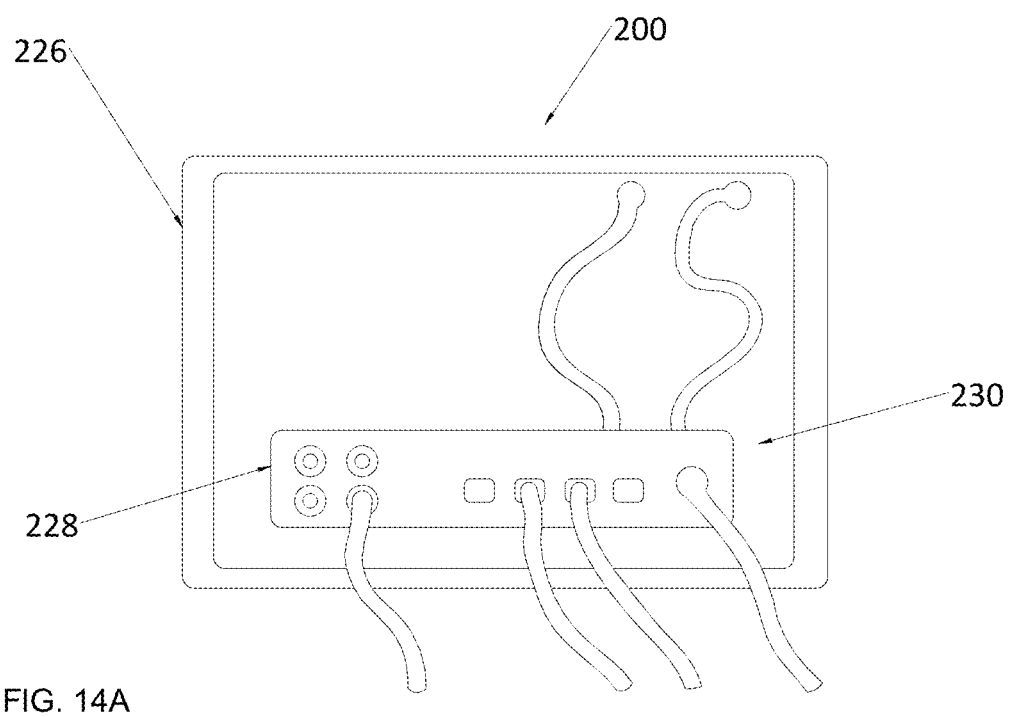
FIG. 14A shows a first view of an example wiring harnesses for use with an example apparatus for use with the system and method herein for securing and using a mobile device in a vehicle.

The apparatus according to various embodiments (e.g. 100, 200, 300, 400, 1000 etc.) may further comprise a housing portion (102, 202, 302, 1002 etc.). This portion may be sized or configured for insertion into a standard vehicle receiver outlet or harness, for example, a single or double DIN vehicle receiver outlet or harness. An example harness 130 may be seen as part of the housing in FIGS. 1A-1F, 2A-2F. Further details regarding the wiring harness may be seen in FIGS. 14A-B. FIG. 14B may be understood to include wiring harness 230 pin assignments for the apparatus. The housing portion 102, 1002 etc. may include the internal components which may be used to facilitate the functionality of the apparatus. Details of the internal components may be seen in FIGS. 7-10 and described further herein. The shelf portion 104, 1104, in various embodiments, may likewise include internal components for facilitating the functionality of the apparatus 100.

The housing 102, 1102 may comprise a heat-resistant material, for example, a metal. The housing may include apertures or vents 132, 1132. The housing 102, 1102 may also include a back 126, 1126 with accessibility to cable inputs 128, 1128. The back may likewise feature wiring harness inputs 130, 1130.

Another embodiment of the apparatus, system, and method may be seen in FIGS. 3A-3B. The apparatus 200 may include a housing portion 202, shelf portion 204, inclined portion 206, lip 208, first side 222, second side 224, cable inputs 228, wiring harness input 230, top 238, and apertures 230.

FIG. 4 shows a front view of an embodiment of an apparatus 300 for use with the system and method herein. The apparatus 300 may include one or more magnetic fasteners 342, in lieu of or supplemental to a gripping surface as described above. The fasteners 342 may be provided on an inclined surface 306 of a shelf portion 304. The fasteners 342 may be provided within the apparatus 300.

Buttons 310, including a charging status 336 and AI button 335 may likewise be seen, for example, on the lip 308.

FIG. 5 shows a side view of an embodiment of an apparatus 300 for use with the system and method herein. The apparatus 300 may include a number of shelf angles 344, 346 for providing a mobile device on the inclined surface 306 of a shelf portion 304. The shelf portion 304 may likewise include a lip 308. Flanges 318 and a housing portion 302 may also be seen, along with a USB port 316.

FIGS. 6A and 6B show another embodiment of an apparatus 400 for use with the system and method herein provided in a vehicle 452. The apparatus 400 may, in various embodiments, be positioned in a location convenient for access by a driver and/or passenger. For example, the apparatus 400 may be positioned between two front seats in a vehicle dash 452. The apparatus 400 may have an inclined portion 406 and lip 408 which may allow for a mobile device 450 to be easily seen and accessed by a driver and/or passenger in a front of a vehicle. A steering wheel button 135 may be seen on a steering wheel of the vehicle. The apparatus may allow for use of a steering wheel button 135 or other internal vehicle button to access mobile device 450 functionality.

The apparatus 100, 1100, 200, 300, 400 etc. may comprise a receiver. The apparatus 400 may be standard-sized to fit into a vehicle receiver port/vehicle stereo port. The apparatus 400 may be installed, for example, in a standard double DIN vehicle stereo port. In other words, the system including the apparatus 400 may comprise a vehicle having a dash with a vehicle stereo port. The apparatus 400 may allow the positioning of a mobile device in a convenient location to the driver. In various embodiments, the apparatus 400 when installed in a vehicle 452 may allow for a mobile device to sit on the lip 408 with the back of the mobile device 450 resting on the inclined surface 406. In other words, a back of a mobile device (e.g. smart phone, tablet, etc.) may rest against the inclined surface 406 while a side of the mobile device (for example, a long edge) may rest against the lip 408.

Internal Components

Figure 7:
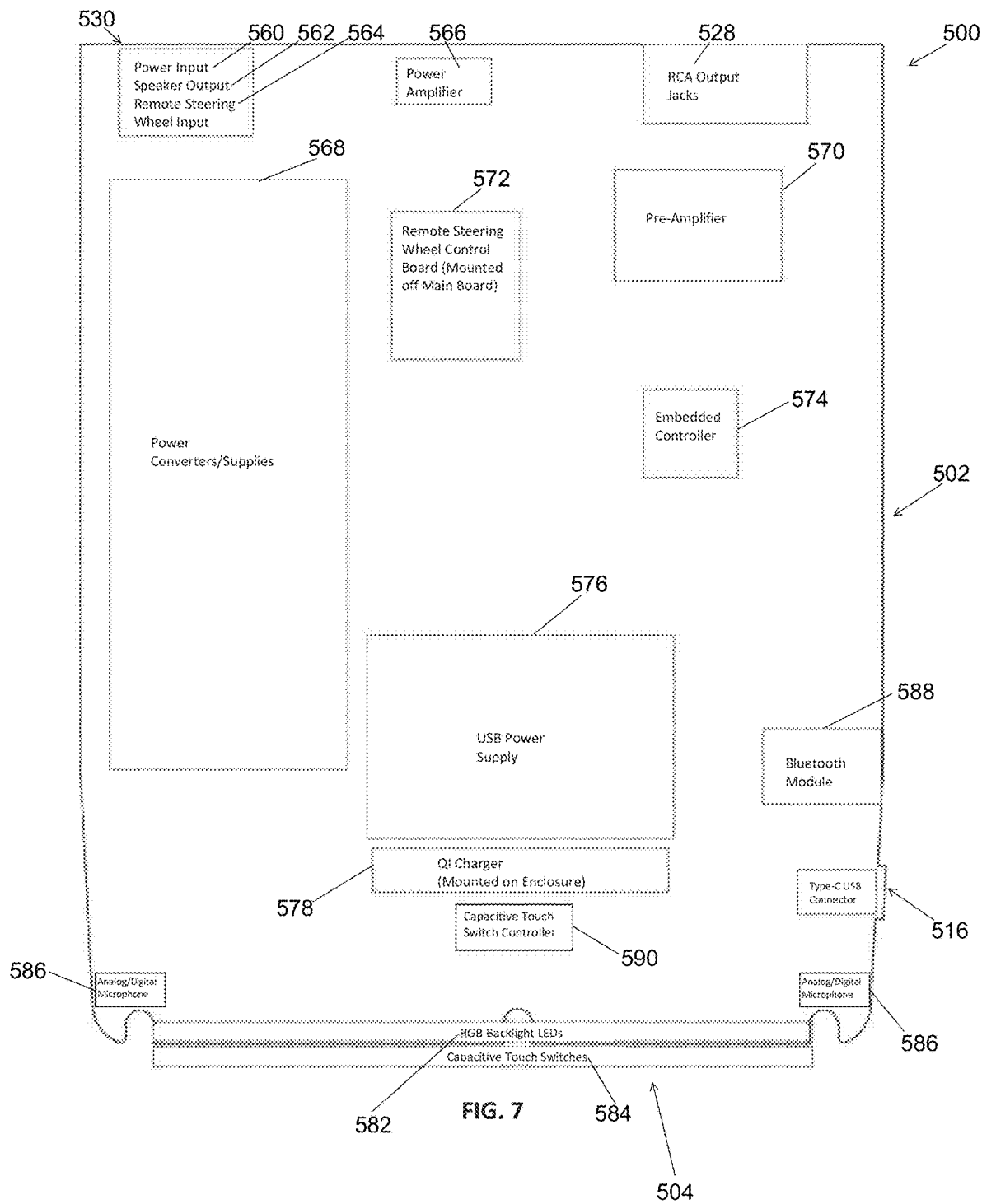
FIG. 7 is a view of an example components diagram of an apparatus for use with the system and method herein for securing and using a mobile device.

FIG. 7 shows a block diagram of an embodiment of internal components of an apparatus for use with the system and method herein according to one or more embodiments 500. The internal components may include a PCB 558 which may include substantially all or only some of the components shown in FIG. 7. The internal components of the apparatus 500 may include, but not be limited to, a power input 560, speaker output 562, remote steering wheel input (which may comprise a harness, for example) 564; a power amplifier 566; RCA output jacks 528; pre-amplifier 570; remote steering wheel control board 572 (this component may or may not be mounted off of the main board); power converters/suppliers 568; embedded controller 574; USB power supply 576; wireless charger (for example, but not limited to, a Qi charger) 578; capacitive touch switch controller 580, 590; RGB LEDs 582; Bluetooth module 588; USB connector 516 (for example, a USB-C type connector), Analog/digital microphones 586; and capacitive touch switches 584. While particular types of connectors, switches, and hardware are disclosed, equivalents should be contemplated as within the scope of this disclosure.

The block diagram of FIG. 7 may illustrate the inside of the apparatus housing (which may comprise, in various embodiments, the housing portion and shelf portion), according to various embodiments. The apparatus may include components for audio processing, data transmission, charging, and the like.

The apparatus may include a power converter 568. The apparatus 500 may be supplied power by the vehicle, which may require processing in order for acceptance by the PCB or board and other internal components 558. The apparatus 500 may also use a power amplifier 566. The power amplifier 566 may allow for the power to be used by the apparatus. The apparatus may likewise include a power-out component (including, for example, USB power supply 576) for charging a mobile device. Connections may be made by the apparatus for power input 560, speaker output 562 (connection to vehicle speakers), and remote steering wheel input 564 (buttons from the steering wheel). These connections may comprise a wiring harness connecting the apparatus with a vehicle (see example embodiments 14A and 14B).

The apparatus 500 may have a number of components adapted for audio feature or processing. These features may include, in various embodiments, an RCA output jack 528 and a pre-amplifier 570. The apparatus 500 may further comprise one or more microphones 586. The one or more microphones 586 may be analog/digital microphones. The apparatus may include two analog/digital microphones. The microphones 586 may be noise-controlled microphones.

A mobile device may obtain power from the apparatus in two ways: through a USB connection 516 and by way of wireless (inductive, for example Qi protocol) charging 578. A USB connection may provide power to a mobile device by way of a USB power supply 576 and USB output connection 516. For the USB connection, in various embodiments, a type-C USB connector may be connected through a USB power supply 576. In order to use the USB charging functionality, a user may use a USB cable. The USB may also be used for device connectivity. For example, the USB may be used to connect the mobile device to the apparatus to enable apparatus functionality (such as but not limited to audio playback, phone call connectivity, AI connectivity, etc.).

Figure 11A:
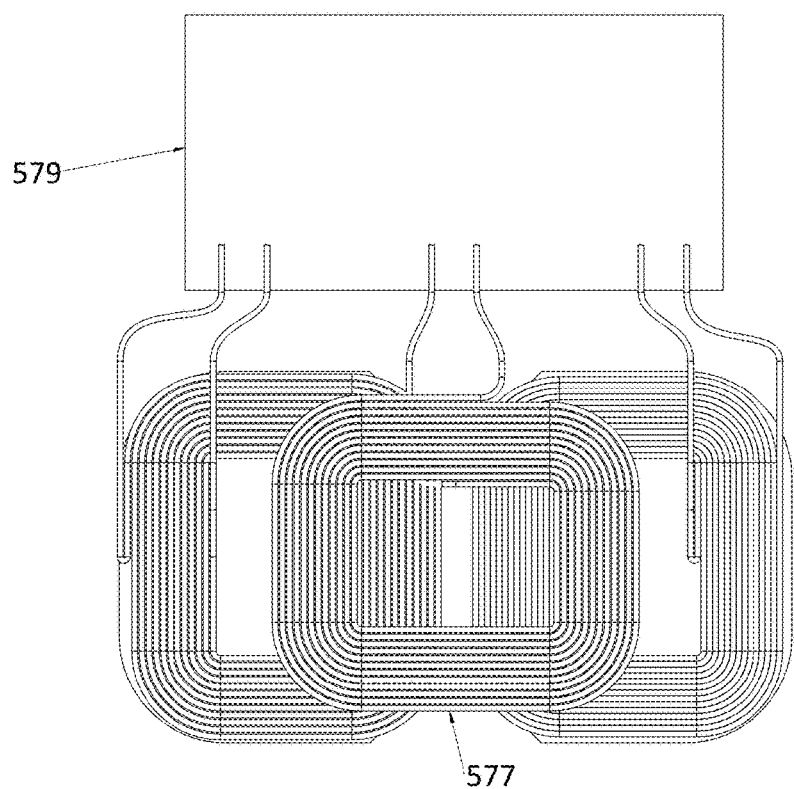
FIG. 11A shows a first view of an example wireless charging coil for use with an example apparatus for use with the system and method herein for securing and using a mobile device in a vehicle.
Figure 11B:
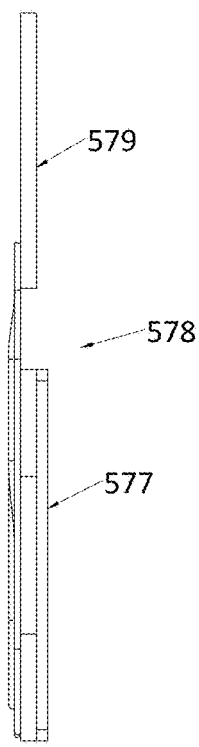
FIG. 11B shows a second view of an example wireless charging coil for use with an example apparatus for use with the system and method herein for securing and using a mobile device in a vehicle.
Figure 12:
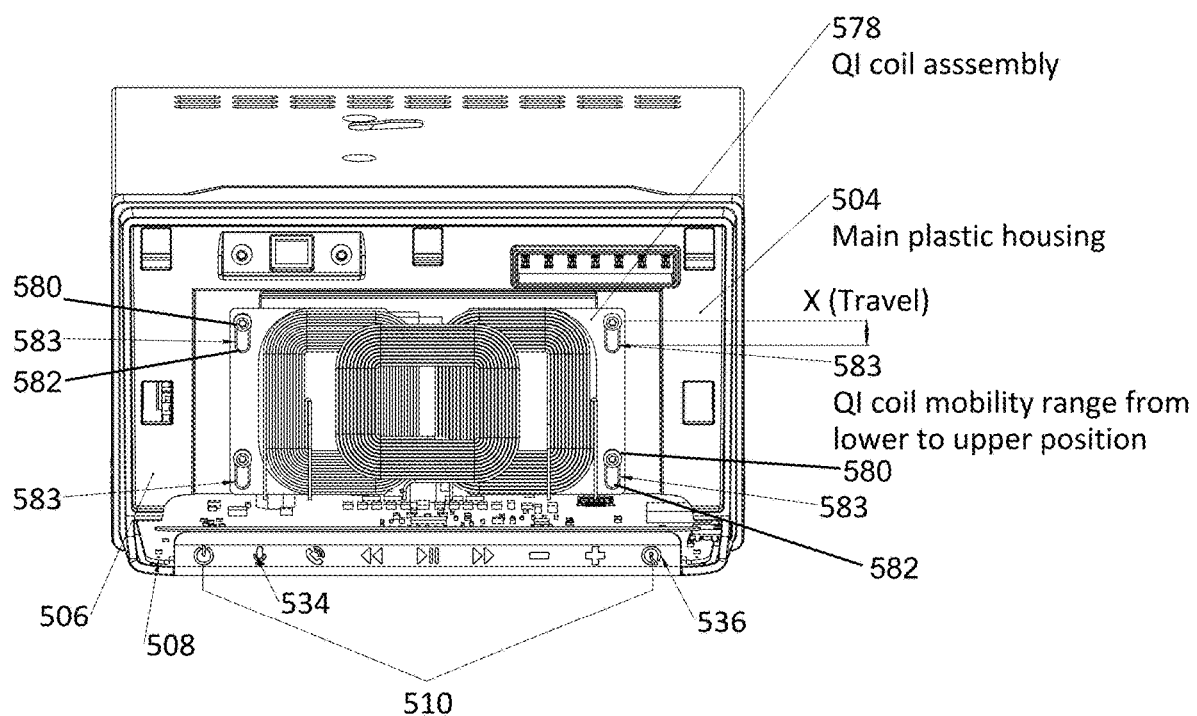
FIG. 12 shows an example wireless charging coil adjustment feature for use with an example apparatus for use with the system and method herein for securing and using a mobile device in a vehicle.

A second way in which a user may charge a mobile device with the apparatus may be through wireless charging. For example, wireless charging may comprise but is not limited to inductive charging. Inductive charging may include a Qi charger 578. A Qi charger 578 for use with the apparatus, system, and method herein may include a number of coils 577, as well as a heatsink backing material 581, an example of which is shown in FIGS. 11A and 11B and described further herein. The Qi charger 578 may also include an adjustment mechanism as shown in FIG. 12 and described further herein. The Qi charger adjustment mechanism 583 may create improved charging capabilities between the apparatus and a mobile device.

The apparatus may include a controller 574. The controller 574 may be embedded in the device 500 or PCB 558. The controller 574 may be suitable to perform the functions described herein. For example, the embedded controller may include an ARM Cortex M4 Kinetis K20 Microcontroller. The microcontroller may be a 32-bit, 120 MHz microcontroller with 512 KB of flash memory. While specific features and numerical ranges for attributes are described, controllers having the power and attributes (including memory, processing power, etc.) necessary to perform the disclosed functionalities should be contemplated as within the scope of this disclosure.

The apparatus may include a wireless data transmission module such as, but not limited to, a Bluetooth module 588. While a Bluetooth module is disclosed, Low Energy Bluetooth and other Bluetooth protocols should be considered within the scope of this disclosure. In addition, other methods for the wireless and wired transmission of data should be contemplated as within the scope of this disclosure.

The apparatus may include a capacitive touch switch (button) controller 580, 590 and one or more buttons (e.g. 110, 1110, 310), which may comprise capacitive touch switches 584. The capacitive touch switches 584 may enable a user to touch the apparatus in a particular location to enable certain functionality (for example, play, pause, call, access AI, etc.). The capacitive touch switch 584 may be provided, for example, on the shelf portion 504 of the apparatus 500. One or more capacitive touch switches may be provided on a front edge of the lip. A user touch of the capacitive touch switch 584 may be received by a capacitive touch switch controller 580.

The apparatus 500 may also include one or more light-emitting diodes (LEDs) 582. The LEDs may be provided behind the capacitive touch switches 584, for example, to indicate function status or to illuminate the buttons for ease of perception. The LEDs 582 may be particularly useful in low-light situations. The LEDs 582, in various embodiments, may be controlled by a light dimming feature provided by the vehicle. In various embodiments, the LEDs 582 may allow for communication of functionality status to a user. For example, the LEDs may illuminate a Qi charging connection indicator (e.g. button 136, 336) in a particular color depending on the mobile device charging status.

Figure 8A:
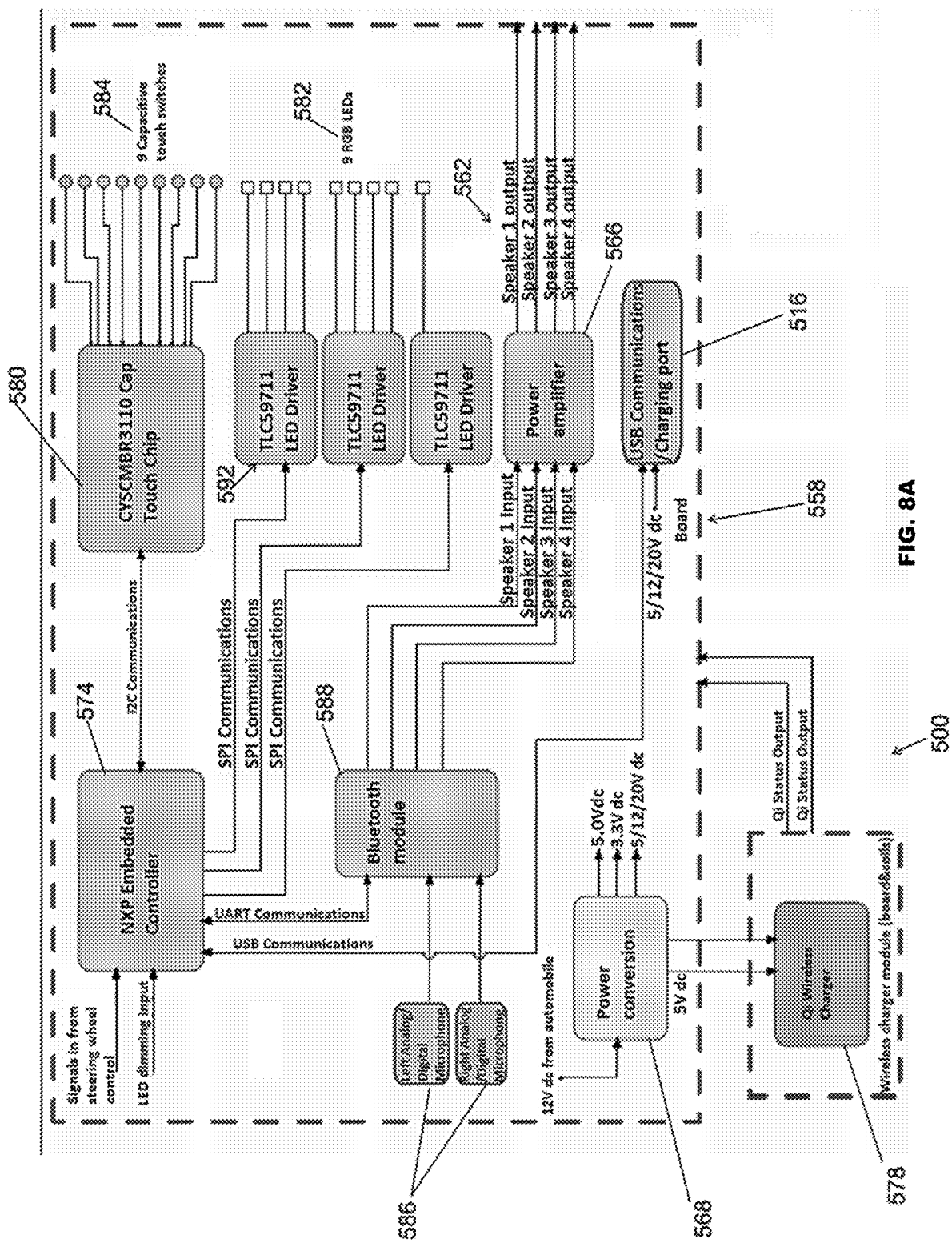
FIG. 8A shows a first example view of a number of interactions of the components of the apparatus, system, and method herein for securing and using a mobile device in a vehicle.
Figure 8B:
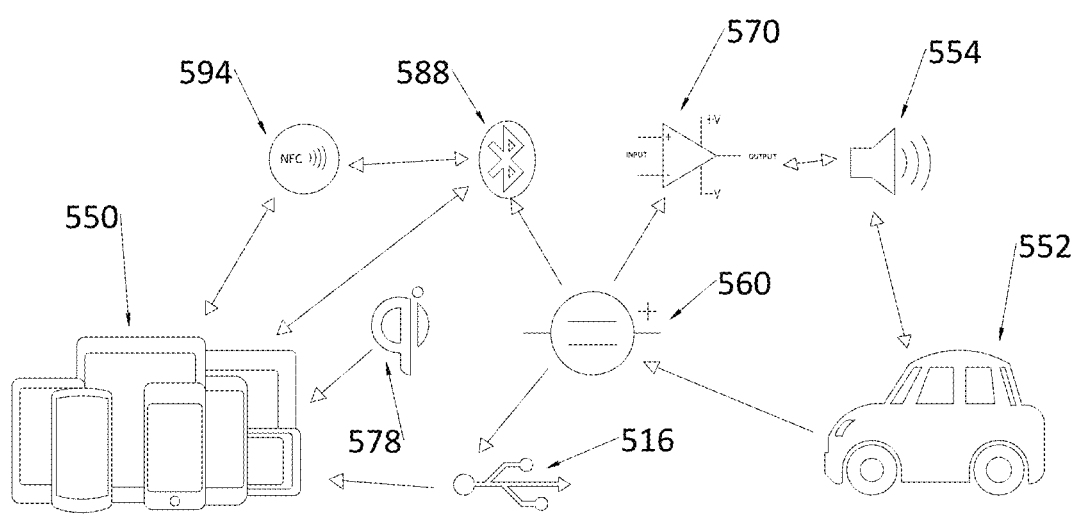
FIG. 8B shows a second example view of number of interactions of the components of the apparatus, system, and method herein for securing and using a mobile device in a vehicle.
Figure 9A:
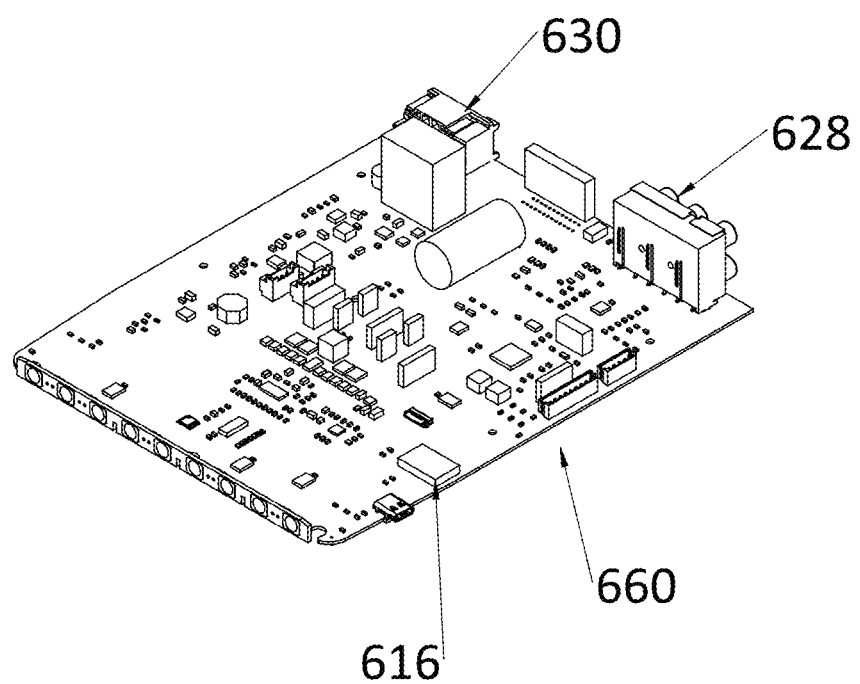
FIG. 9A shows a first view of an example logic board for use with an example apparatus for use with the system and method herein for securing and using a mobile device in a vehicle.
Figure 9B:
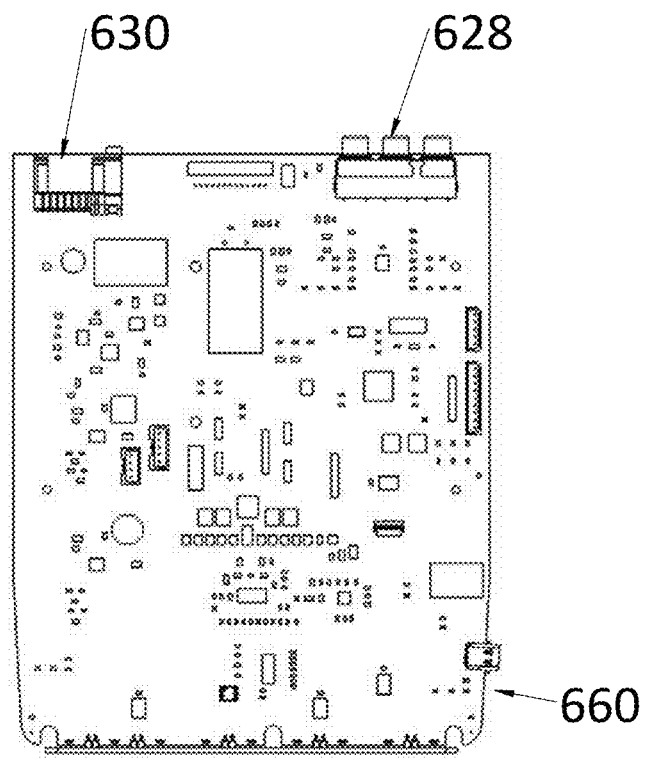
FIG. 9B shows a first view of an example logic board for use with an example apparatus for use with the system and method herein for securing and using a mobile device in a vehicle.
Figure 9C:
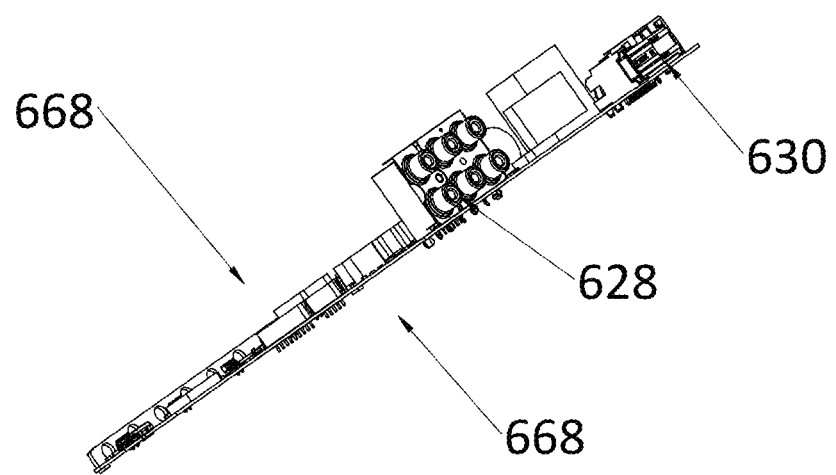
FIG. 9C shows a first view of an example logic board for use with an example apparatus for use with the system and method herein for securing and using a mobile device in a vehicle.
Figure 9D:
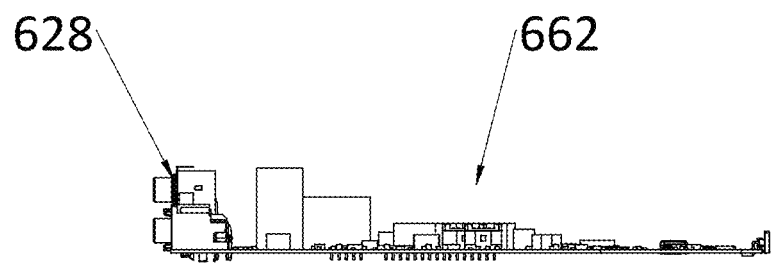
FIG. 9D shows a first view of an example logic board for use with an example apparatus for use with the system and method herein for securing and using a mobile device in a vehicle.
Figure 9E:
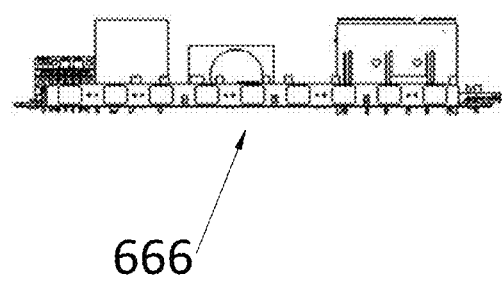
FIG. 9E shows a first view of an example logic board for use with an example apparatus for use with the system and method herein for securing and using a mobile device in a vehicle.
Figure 9F:
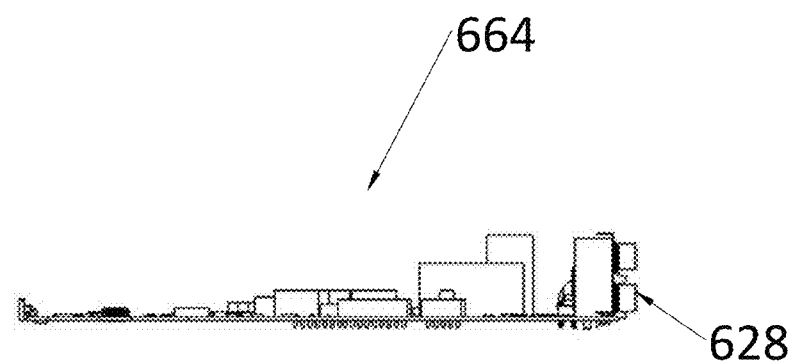
FIG. 9F shows a first view of an example logic board for use with an example apparatus for use with the system and method herein for securing and using a mobile device in a vehicle.
Figure 10A:
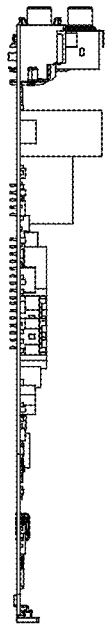
FIG. 10A shows a first view of a second set of a number of views of an example logic board for use with an example apparatus for use with the system and method herein for securing and using a mobile device in a vehicle.
Figure 10B:
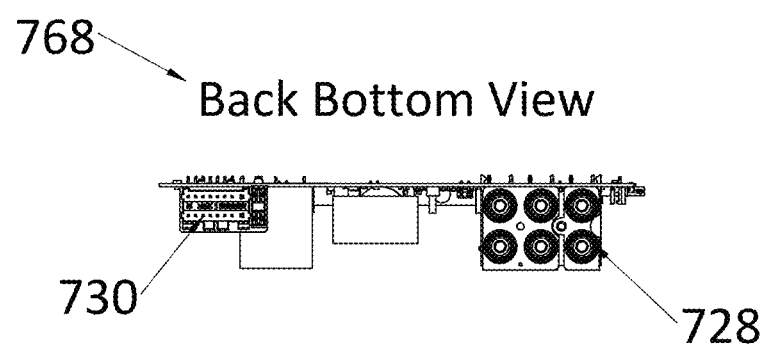
FIG. 10B shows a first view of a second set of a number of views of an example logic board for use with an example apparatus for use with the system and method herein for securing and using a mobile device in a vehicle.
Figure 10C:
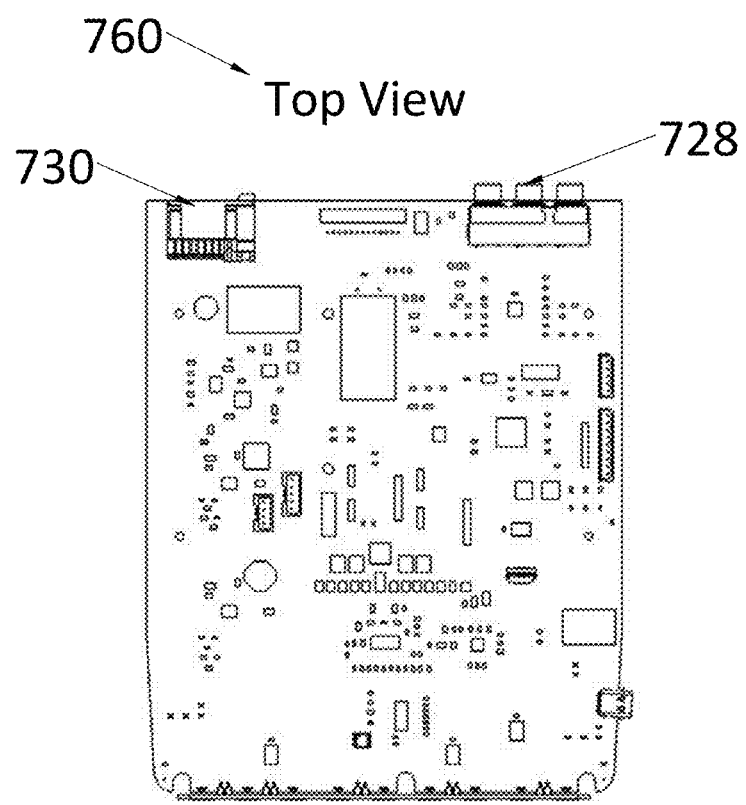
FIG. 10C shows a first view of a second set of a number of views of an example logic board for use with an example apparatus for use with the system and method herein for securing and using a mobile device in a vehicle.
Figure 10D:
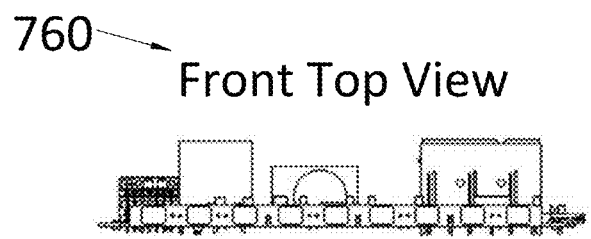
FIG. 10D shows a first view of a second set of a number of views of an example logic board for use with an example apparatus for use with the system and method herein for securing and using a mobile device in a vehicle.
Figure 10E:
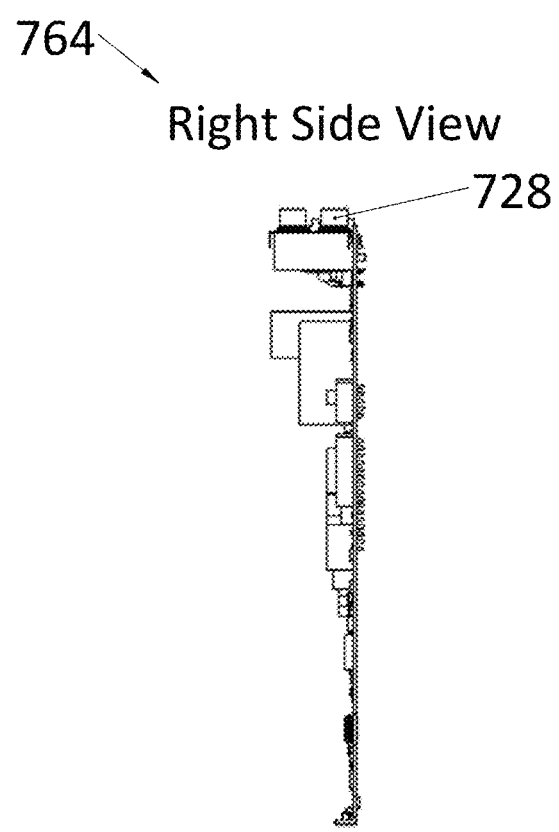
FIG. 10E shows a first view of a second set of a number of views of an example logic board for use with an example apparatus for use with the system and method herein for securing and using a mobile device in a vehicle.
Figure 10F:
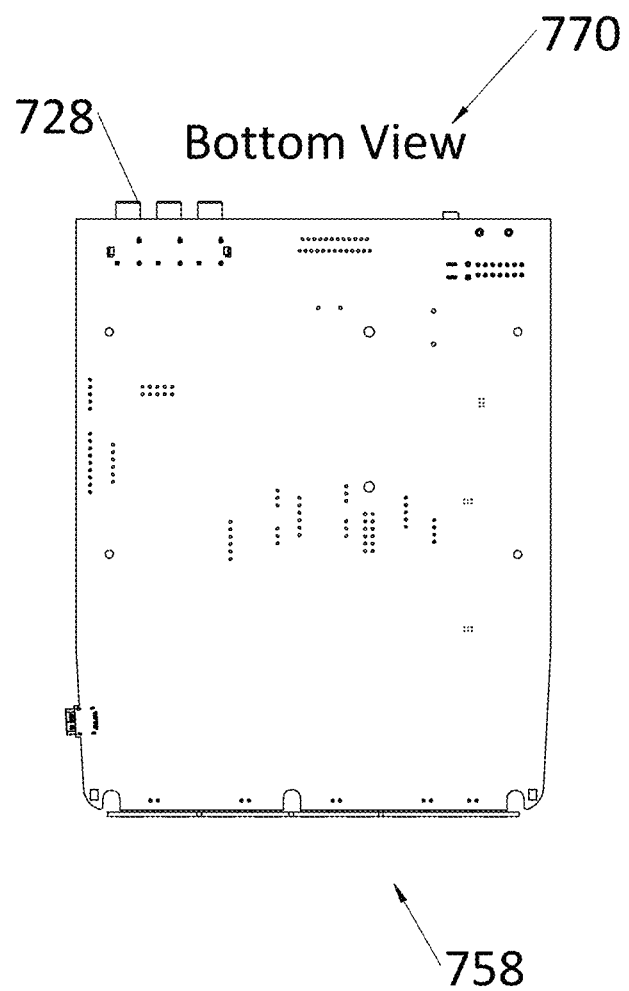
FIG. 10F shows a first view of a second set of a number of views of an example logic board for use with an example apparatus for use with the system and method herein for securing and using a mobile device in a vehicle.

A diagram of interaction of apparatus components may be seen, for example, in FIGS. 8A-8B. While specific parts types, for example, as shown in FIG. 8A, may be given, these are for example only and are not limiting. Similar and equivalent parts should be contemplated as within the scope of this disclosure. The apparatus, for example, the interior components, may interact with various components provided within the vehicle. For example, as shown in FIG. 8A, steering wheel inputs and LED dimming inputs (instructions from the vehicle to alter light levels—which may be used by the apparatus for example to alter the brightness of LEDs) may be interpreted by the controller 574. The controller 574 may send and receive instructions to and from a capacitive touch chip 580 (which may communicate with capacitive touch switches or buttons 584), LED drivers 592 (which may communicate with LEDs 582), Bluetooth module, 588, and USB communications or charging port 516. The microphones 586 may communicate with the Bluetooth module 588. The Bluetooth module may communicate with a power amplifier 566 which may communicate with speaker outputs 562. The power conversion component 568 may accept power from the vehicle and transmit power through the Qi charger 578. The power to the Qi charger 578 may be provided separately from internal power controls, for example, as shown in FIG. 8A.

FIG. 8B shows a number of connection components made between a vehicle 552 and mobile device 550. These connections may include the vehicle internal sound system 554, a pre-amplifier 570, power input from the vehicle to the apparatus 560, a USB input 516, wireless charging 578, and Bluetooth connection 588. In various embodiments, the apparatus may feature a nearfield connection (NFC) 594.

The apparatus interior components may include a PCB 558, examples of which are shown in FIGS. 9A-F (PCB 658) and FIGS. 10A-F (PCB 758). The PCB may include one or more (or substantially all of) the components shown in FIG. 7. FIGS. 9A-F show a top 660, left side 662, right side 664, front 666, back view 668, and bottom view 670 of a PCB 658 including cable inputs (RCA input jacks) 628, a USB input 616, and a wiring harness input 630. Similarly, FIGS. 10A-F show a top 760, left side 762, right side 764, front top 766, back view 768, and bottom view 770 of a PCB 758 including cable inputs (RCA input jacks) 728 and a wiring harness input 730.

Wireless Charger and Movement

Figure 11C:
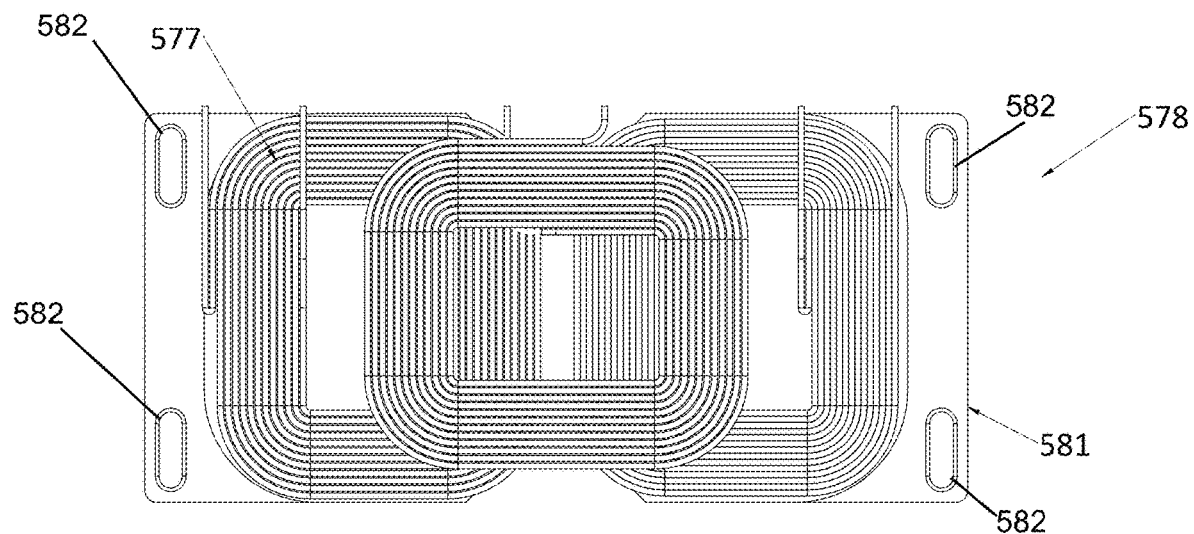
FIG. 11C shows a third view of an example wireless charging coil for use with an example apparatus for use with the system and method herein for securing and using a mobile device in a vehicle.

FIGS. 11A-C and FIG. 12 show example embodiments of a wireless charging mechanism 578 for use with the apparatus. More specifically, the wireless charging mechanism 578 may be a Qi charger, in various embodiments. FIGS. 11A, 11B, and 11C show a number of coils 577 and a wireless charging controller 579. While three coils are shown, more or less (e.g. 1, 2, 4, 5, 6, etc.) should be contemplated as within the scope of this disclosure. The circuit board may be shielded, for example, by providing metal shielding. The PCB may allow for a layer of copper above and below a circuit trace. The shielding may assist with allowing mobile device functionality (e.g. by way of Bluetooth transmission) with wireless (for example, but not limited to, Qi) charging.

The coils may include a backing material (for example, a heatsink) 581. The backing material may comprise, for example, a ferrite material. The coils may be attached to the backing material by way of an adhesive which may be a pressure sensitive adhesive (PSA). The backing material may be likewise attached to a heatsink by way of an adhesive. The adhesive connecting the backing material to the heatsink may be a pressure sensitive adhesive (PSA).

The leads of the charging coils 577 may be connected to a circuit board 579, for example, a wireless charger module board. In various embodiments, the coils may be provided on a backing material for dispersing heat—as a non-limiting example a heatsink 581. The heatsink 581 may be comprised of a suitable heat-dissipating material. The material may be aluminum or copper, for example, though suitable other materials and alloys should be understood as within the scope of this disclosure.

As shown in FIG. 12, the wireless charger 578 (for example, but not limited to, a Qi charger) may be mounted on the enclosure 504 behind the inclined surface 506, in various embodiments. The wireless charging coils 577 (for example, but not limited to, Qi charging coils) may be accessible by removing the inclined surface 506, for example.

The wireless (for example, but not limited to, Qi) charger 578 may be adjustable or mobile by way of a mobility feature 583. The wireless charging coil assembly 578 (for example, but not limited to, Qi charging coil assembly) may be moveable in a (x) direction. The adjustable coil features 583 may allow for a superior connection to a mobile device for charging. Therefore, a range of sizes of devices may be able to use the wireless charging functionality of the apparatus 500.

Looking to FIG. 11C, the wireless charger 578 may comprise coils 577 may be mounted on a backing 581 which may further comprise a plurality of slots or openings 582 (seen in FIG. 11C as comprising four slots, one provided in each corner). As shown in FIG. 12, these slots or openings may be provided into the enclosure 504 behind the inclined surface 506 by interaction with a plurality of fastening mechanisms (for example, screws). In FIG. 12, for example, four fastening mechanisms 580 may be seen protruding through four slots 582 provided on the wireless charging backing 581. The fastener and slot interaction may allow for travel of the charger 178 along an axis relative to the housing.

Mobile Device Function Access

The apparatus may allow the user to access functionality available in the mobile device. For example, the apparatus may be used to access the mobile device artificial intelligence or assistant (AI) functionality. The mobile device AI may include, but not be limited to, known AI systems such as Siri (Apple devices), Cortana (Microsoft), Google (Google products), Alexa (Amazon), etc. These programs may be a virtual assistant that may enable functionality within the mobile device. In various embodiments, the apparatus may be used to access phone functionality available in the mobile device.

Various hardware components of the apparatus may be used to access the mobile device functionality. For example, one or more buttons (for example, a steering wheel button 135 and a touch-based button 110) may be used to trigger the AI functionality.

Figure 13:
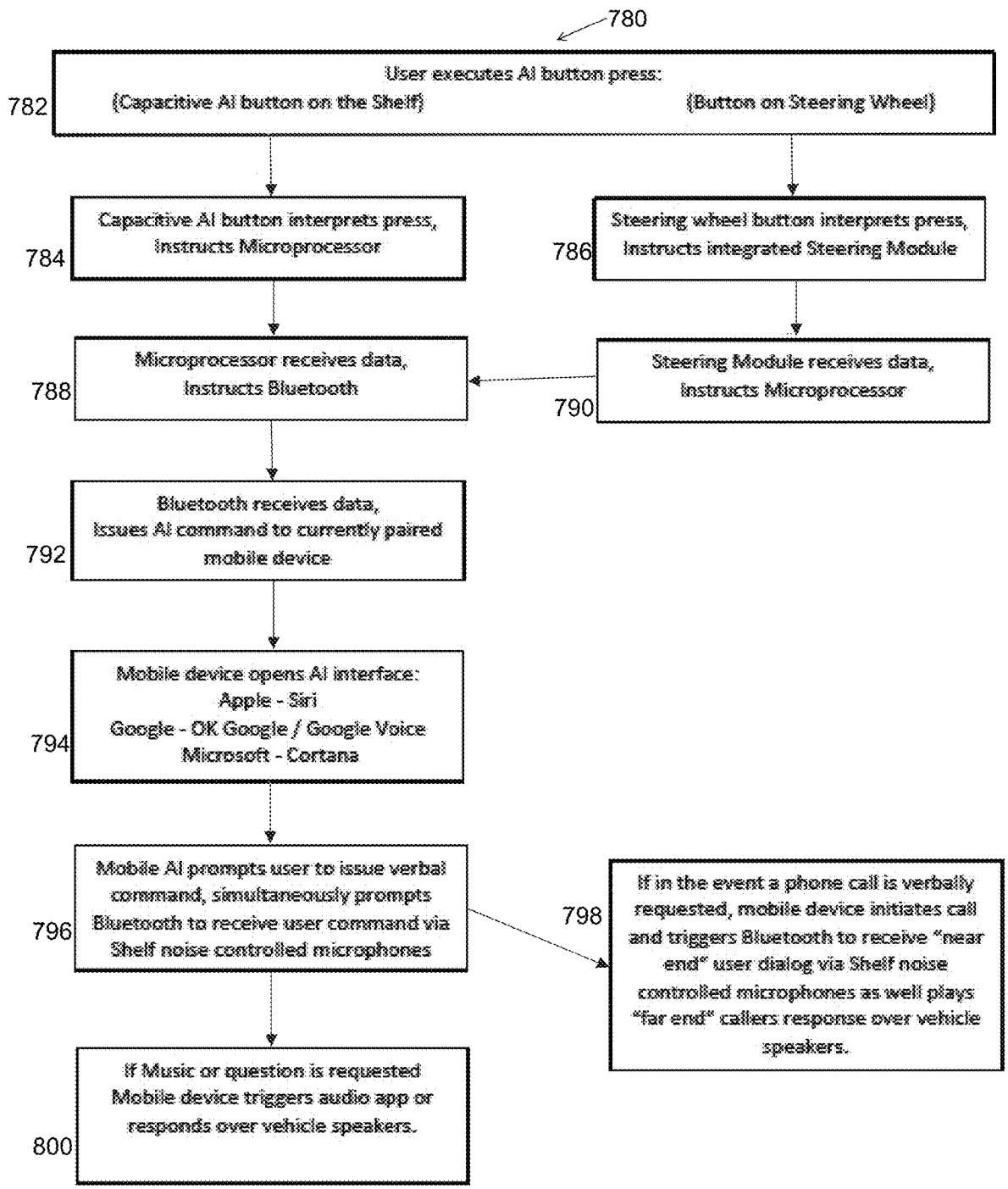
FIG. 13 is an example workflow for use with an example apparatus for use with the system and method herein for securing and using a mobile device in a vehicle (in various embodiments an AI engagement workflow for use with the system and method herein).

FIG. 13 shows an example workflow for operations performed by the user and apparatus. The workflow or algorithm 780 shows how the apparatus may allow for access to mobile device functionality. In various embodiments, FIG. 13 shows an example of an AI engagement workflow for use with the system and method herein.

First, (step 782) a user may press a button or other trigger for interaction with the apparatus. For example, the button may be a capacitive AI button provided on the apparatus. As another example, a steering wheel button may be pushed. The steering wheel button may be part of the vehicle onboard system.

If the button press is executed on the steering wheel, the press may be transmitted by the vehicle, for example, through an internal vehicle wiring system (step 786). The press may be received by the apparatus, for example, through a wiring harness and received by a steering module; the press may be received from the vehicle's internal wiring by the apparatus steering control module. The steering module may be integrated with the PCB or other internal components of the apparatus. Next, the steering control module may instruct the microprocessor (step 790). In addition to FIG. 13, an example embodiment of this process may also be seen in FIG. 8A. While a steering wheel button press is described, other vehicle button interactions should be contemplated as within the scope of this disclosure.

A button press may also be executed on the apparatus, in various embodiments. The button may comprise, for example, a capacitive touch sensor. The button provided in the apparatus may be directly connected to a microprocessor or may first be interpreted by a capacitive touch chip and then transmitted to a microprocessor (step 784). While a capacitive touch button is described, other suitable mechanisms for transmitting a signal, for example, a push-button or similar technology may be used.

Next, (step 788) the microprocessor may transmit the button press data (whether from an internal vehicle component or on the apparatus) to a data transmission module, for example, a Bluetooth module. While a Bluetooth module is disclosed, modules having similar functionality may be contemplated as within the scope of this disclosure (wireless, radio, etc.). Alternatively, the controller may connect directly to the mobile device (for example, as shown in FIG. 8A). In other words, data regarding a button press may be transmitted from the controller directly to the mobile device by way of a USB connection, for example. The button press may be interpreted as a particular command type, for example, an AI command.

The command may be transmitted to the mobile device (step 792), for example, through wireless or wired connection (for example, but not limited to, USB) means. The data transmission may be made, for example, to the currently "paired" mobile device (i.e. device connected via Bluetooth or wireless means to the mobile device vehicle apparatus, as distinguished from other devices within range).

The mobile device may receive the instruction and open the AI interface (step 794). The AI interface may be operating system dependent, for example, an Apple device may use Siri, Google "Ok Google" or Google Voice, and Microsoft may use Cortana.

After the mobile device opens the AI interface, the mobile device AI may prompt the user to issue a verbal command (step 796). Simultaneously, the mobile device may prompt the wireless module (such as but not limited to Bluetooth) or the controller to receive the user command, in various embodiments. The apparatus may include one or more microphones. In various embodiments, the one or more microphones may be noise-controlled microphones. The apparatus may receive user commands by way of the apparatus microphones.

The apparatus may receive the commands and behave according to the command. For example, if the user requests music or an answer to a question, the mobile device may trigger an application on the mobile device (for example, a music application) and response over vehicle speakers (mobile device response may be broadcast through vehicle speakers) (step 800).

Alternatively, in various embodiments, if a user requests a phone call for example, the mobile device may initiate the call and trigger the apparatus (for example, through a Bluetooth connection) (step 798). The apparatus may execute a "near end" user dialog by way of the microphones (in various embodiments, noise-controlled microphones). In addition, the apparatus may transmit the "far end" caller response over the vehicle speakers. Wireless charging functionality may be disabled during a phone call. While specific technologies (wireless, particular AI types, etc.) and apparatus types (for example, "shelf" or "music") may be referenced in the Figure, these are non-limiting examples.

To use the apparatus, system, and method herein, a user may first install the apparatus onto a vehicle. Installation may involve removal of the vehicle's current radio and connection of the vehicle radio wiring harness to the apparatus. To complete installation, the apparatus may be fastened into the standard radio port of the vehicle. Installation may be similar, in various embodiments, to installation of a vehicle receiver.

Next, a user may connect their mobile device to the apparatus. This may involve "pairing" the device via Bluetooth. Alternatively, the user may plug their device into the USB port using a USB cable. Next, the user may place the mobile device on the apparatus. Typically, the user may place the device on its side on the lip portion of the apparatus, with the back resting against the inclined surface. The user may wish to adjust the wireless charging assembly (e.g. Qi charger) to better connect to the charging functionality in the user's mobile device. The user then may open the front of the shelf portion to access the Qi coil assembly (e.g. 578) and adjust the coils by sliding the assembly along the coil mobility feature (e.g. 583) or axis. Then, the user may proceed to close the shelf portion and place the mobile device on the apparatus and charge the mobile device with the wireless charger (e.g. 578). The user may configure the apparatus to work with their vehicle's steering controls. The user may then access the functionality, in various embodiments, using the manner described herein.

The apparatus, system, and method may include a number of advantages. For example, a user may use mobile device features as in-vehicle functionality. This may save significant time and cost for a user; for example, in saving money on navigation contract systems, time in training a new AI system, and ease of upgrades through the mobile device operating system. The apparatus may be configured to connect a mobile device with a car's internal components including the stereo system and audio controls. The apparatus may be sized to be accepted in a vehicle stereo port. The apparatus may allow for control of the mobile device through vehicle controls.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any algorithm, process, or method steps may be varied or re-sequenced according to alternative embodiments. Likewise, some algorithm or method steps described may be omitted, and/or other steps added. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems. Aspects of the method described herein are implemented on a software system running on a computer system. To this end, the methods and system may be implemented in, or in association with, a general-purpose software package or a specific purpose software package. As a specific, non-limiting example, the device could be a vehicle entertainment system or mobile device vehicle apparatus in communication with a mobile device.

The software system described herein may include a mixture of different source codes. The system or method herein may be operated by computer-executable instructions, such as but not limited to, program modules, executable on a computer. Examples of program modules include, but are not limited to, routines, programs, objects, components, data structures, and the like which perform particular tasks or implement particular instructions. The software system may also be operable for supporting the transfer of information within a network.

While the descriptions may include specific devices or computers, it should be understood the system and/or method may be implemented by any suitable device (or devices) having suitable computational means. This may include programmable special purpose computers or general-purpose computers that execute the system according to the relevant instructions. The computer system or portable electronic device can be an embedded system, a personal computer, notebook computer, server computer, mainframe, networked computer, workstation, handheld computer, as well as now known or future developed mobile devices, such as for example, a personal digital assistant, cell phone, smartphone, tablet computer, mobile scanning device, and the like. Other computer system configurations are also contemplated for use with the communication system including, but not limited to, multiprocessor systems, microprocessor-based or programmable electronics, network personal computers, minicomputers, smart watches, and the like. Preferably, the computing system chosen includes a processor suitable for efficient operation of one or more of the various systems or functions or attributes of the communication system described.

The system or portions thereof may also be linked to a distributed computing environment, where tasks are performed by remote processing devices that are linked through a communication network(s). To this end, the system may be configured or linked to multiple computers in a network including, but not limited to, a local area network, wide area network, wireless network, and the Internet. Therefore, information, content, and data may be transferred within the network or system by wireless means, by hardwire connection, or combinations thereof. Accordingly, the devices described herein communicate according to now known or future developed pathways including, but not limited to, wired, wireless, and fiber-optic channels.

In one or more examples of embodiments, data may be stored remotely or may be stored locally on a user device in a suitable storage medium. Data storage may be in volatile or non-volatile memory. Data may be stored in appropriate computer-readable medium including read-only memory, random-access memory, CD-ROM, CD-R, CD-RW, magnetic tapes, flash drives, as well as other optical data storage devices. Data may be stored and transmitted by and within the system in any suitable form. Any source code or other language suitable for accomplishing the desired functions described herein may be acceptable for use.

The system may also include computer-readable media which may include any computer-readable media or medium that may be used to carry or store desired program code that may be accessed by a computer. The invention can also be embodied as computer-readable code on a computer-readable medium. To this end, the computer-readable medium may be any data storage device that can store data. The computer-readable medium can also be distributed over a network-coupled computer system so that the computer-readable code is stored and executed in a distributed fashion.

What is claimed is:

1. A mobile device vehicle apparatus comprising:
a housing portion comprising a wiring harness; and
a shelf portion having an inclined surface and lip, the lip extending away from the inclined surface;
wherein the housing portion or the shelf portion further comprising a wireless data transmission module, a wiring harness, and a wireless charger; and
wherein the wireless charger is provided behind the inclined surface of the shelf portion.

2. The mobile device vehicle apparatus of claim 1, wherein the wireless data transmission module comprises a Bluetooth module.

3. The mobile device vehicle apparatus of claim 1, wherein the wireless charger comprises a Qi charger.

4. The mobile device vehicle apparatus of claim 3, wherein the Qi charger is adjustable along an axis relative to the inclined surface of the shelf portion.

5. The mobile device vehicle apparatus of claim 1, wherein the wireless charger is provided on a heatsink material.

6. The mobile device vehicle apparatus of claim 5, wherein the heatsink material has a plurality of slots.

7. The mobile device vehicle apparatus of claim 6, wherein the plurality of slots receive a plurality of fasteners provided in the vehicle housing portion or shelf portion.

8. The mobile device vehicle apparatus of claim 7, wherein the heatsink material slides along an axis by way of the plurality of slots.

9. A system for enabling mobile device functionality in a vehicle, the system comprising:
a vehicle comprising a dash;
an apparatus provided into the dash, the apparatus comprising:
a housing portion comprising a wiring harness; and
a shelf portion having an inclined surface and lip, the lip extending away from the inclined surface;
wherein the housing portion or the shelf portion further comprising a wireless data transmission module, a wiring harness, and a wireless charger; and
wherein the wireless charger is provided behind the inclined surface of the shelf portion; and
a mobile device provided on the shelf portion.

10. The system for enabling mobile device functionality in a vehicle of claim 9, wherein the mobile device rests with a back against the inclined surface of the apparatus shelf portion and a side against the shelf portion lip.

11. The system for enabling mobile device functionality in a vehicle of claim 10, wherein the wireless charger provides power to the mobile device.

12. The system for enabling mobile device functionality in a vehicle of claim 11, wherein the mobile device is wirelessly connected to the apparatus by way of the wireless data transmission module.

13. The system for enabling mobile device functionality in a vehicle of claim 12, wherein the wireless data transmission module is a Bluetooth module.

14. The system for enabling mobile device functionality in a vehicle of claim 12, wherein the apparatus is coupled to the vehicle by way of the wiring harness and the mobile device is thereby in communication with the vehicle by way of the apparatus.

15. The system for enabling mobile device functionality in a vehicle of claim 9 wherein the apparatus is connected to the mobile device by way of Bluetooth, Qi charging, or both.

16. A vehicle comprising:
a dash;
an apparatus provided into the dash, the apparatus comprising:
a housing portion comprising a wiring harness; and
a shelf portion having an inclined surface and lip, the lip extending away from the inclined surface;
wherein the housing portion or the shelf portion further comprising a wireless data transmission module, a wiring harness, and a wireless charger; and
wherein the wireless charger is provided behind the inclined surface of the shelf portion.

17. The vehicle of claim 16, wherein the vehicle further comprises speakers and a steering wheel button, and wherein the apparatus is in communication with the speakers and steering button.

18. The vehicle of claim 16 wherein the vehicle comprises a standard stereo port and the apparatus is provided in the vehicle stereo port.

19. The vehicle of claim 16, wherein the wireless charger is a Qi charger.

20. The vehicle of claim 17, wherein the steering wheel button accesses a mobile device in communication with the apparatus.

* * * * *